(12) United States Patent
Ganz et al.

(10) Patent No.: US 11,739,019 B2
(45) Date of Patent: Aug. 29, 2023

(54) HIGH-STRENGTH WELDING PROCESS FOR MAKING HEAVY GLASS PREFORMS WITH LARGE CROSS SECTIONAL AREAS

(71) Applicants: Heraeus Quartz North America LLC, Buford, GA (US); Heraeus Quarzglas GmbH & Co. KG, Hanau (DE)

(72) Inventors: Oliver Ganz, Bruchköbel (DE); Kenneth Robert Koch, Flowery Branch, GA (US); Tim Alan Pontsler, Jefferson, GA (US)

(73) Assignees: HERAEUS QUARTZ NORTH AMERICA LLC, Buford, GA (US); HERAEUS QUARZGLAS GMBH & CO. KG, Hanau (DE)

( * ) Notice: Subject to any disclaimer, the term of this patent is extended or adjusted under 35 U.S.C. 154(b) by 158 days.

(21) Appl. No.: 16/746,180

(22) Filed: Jan. 17, 2020

(65) Prior Publication Data

US 2020/0231488 A1 Jul. 23, 2020

Related U.S. Application Data

(60) Provisional application No. 62/795,181, filed on Jan. 22, 2019.

(51) Int. Cl.
*C03B 23/207* (2006.01)
(52) U.S. Cl.
CPC .................. *C03B 23/207* (2013.01)
(58) Field of Classification Search
CPC .................................................. C03B 23/207
See application file for complete search history.

(56) References Cited

U.S. PATENT DOCUMENTS

| | | | |
|---|---|---|---|
| 4,689,065 A | * | 8/1987 | Krause .................. G02B 6/2551 65/42 |
| 6,053,013 A | | 4/2000 | Oh et al. |
| | | (Continued) | |

FOREIGN PATENT DOCUMENTS

| | | |
|---|---|---|
| CN | 1934041 A | 3/2007 |
| CN | 103663957 A | 3/2014 |
| | (Continued) | |

OTHER PUBLICATIONS

CN 109210533 machine translation, Ganz Oliver, A heating burner for generating integrally joined between the quartz glass components, Jan. 15, 2019 (Year: 2019).*

(Continued)

*Primary Examiner* — Queenie S Dehghan
(74) *Attorney, Agent, or Firm* — Panitch Schwarze Belisario & Nadel LLP

(57) ABSTRACT

An apparatus and related process for producing a high-strength weld between two glass components. Chucks clamp and move respective first ends of the glass components toward each other inside an enclosure, where the second ends are heated, softened, and welded together in a weld zone. The enclosure has layers of stacked quartz glass bricks and allows the weld zone to cool slowly and avoid stress. A propane quartz melting torch directs a flame inside the enclosure and toward the second ends as the glass components move toward each other. The flame softens the second ends and creates substantially smooth polished surfaces in the weld zone having an increased hydroxide content. At least 80% of the weld zone has a hydroxide content greater than about 10 ppm average in a 10 μm depth from the surface and the tensile strength of the weld zone is above about 10 MPa.

8 Claims, 11 Drawing Sheets

(56) References Cited

U.S. PATENT DOCUMENTS

| | | | |
|---|---|---|---|
| 6,178,779 B1 | 1/2001 | Drouart et al. | |
| 6,334,973 B1* | 1/2002 | Fukazaki | B29C 43/021 |
| | | | 65/102 |
| 6,484,540 B1* | 11/2002 | Shimada | C03B 37/01211 |
| | | | 65/DIG. 9 |
| 8,161,772 B2 | 4/2012 | Sattmann | |
| 2008/0216513 A1* | 9/2008 | Sato | C03C 3/06 |
| | | | 65/28 |
| 2017/0038528 A1* | 2/2017 | Hoshino | G02B 6/03694 |
| 2017/0183255 A1* | 6/2017 | Walther | C03C 3/091 |
| 2019/0002327 A1 | 1/2019 | Ganz | |

FOREIGN PATENT DOCUMENTS

| | | |
|---|---|---|
| CN | 104944762 A | 9/2015 |
| EP | 1690836 A1 | 8/2006 |
| EP | 3421434 A1 | 1/2019 |
| JP | 2004-043249 | 2/2004 |
| JP | 2004299983 A | 10/2004 |
| JP | 2005067931 A | 3/2005 |
| JP | 2005-298323 | 10/2005 |
| KR | 1020070027490 A | 3/2007 |
| KR | 1020140033674 A | 3/2014 |
| WO | 2007/039426 A1 | 4/2007 |
| WO | 2016/192339 A1 | 12/2016 |

OTHER PUBLICATIONS

Office Action dated Mar. 1, 2021 by the Japanese Patent Office for counterpart Japanese Patent Application No. 2020-007526 (with English translation attached).

Extended European Search Report (EESR) dated May 20, 2020 by the European Patent Office for counterpart European Patent Application No. 20153218.1.

Notice of Allowance dispatched Jul. 29, 2021 by the Korean Intellectual Property Office for counterpart Korean Patent Application No. 10-2020-0008175 (with English translation of cover page attached).

Office Action dated Dec. 15, 2021 by the China National Intellectual Property Administration of the State Intellectual Property Office of People's Republic of China for counterpart Chinese Patent Application No. 202010070233.4 (with English translation attached).

Office Action dated Jul. 29, 2022 in CN Application No. 202010070233.4 (with English Translation and English Translation of Search Report).

Jinhui et al., Introduction to Inorganic Non-metallic Materials, Harbin Institute of Technology Press, 3rd edition (Jul. 2018).

Office Action dated Feb. 3, 2023 in CN Application No. 202010070233.4 (with English Translation).

* cited by examiner

HIGH-STRENGTH WELDING PROCESS FOR MAKING HEAVY GLASS PREFORMS WITH LARGE CROSS SECTIONAL AREAS

CROSS REFERENCE TO RELATED APPLICATION

This application claims the benefit of priority under 35 U.S.C. § 119(e) to earlier filed U.S. Provisional Patent Application No. 62/795,181 filed Jan. 22, 2019, the entire disclosure of which is incorporated by reference herein.

TECHNICAL FIELD

This application relates generally to producing elongated glass components and, more particularly, to a process and apparatus for making heavy glass preforms with large cross sectional areas and, most particularly, to a process and apparatus for producing a welded joint between a first and at least one second glass component.

BACKGROUND

Quartz glass components are used for many applications, such as semi-finished preforms used to make optical fibers in the form of tubes or solid cylinders; in lamp manufacture as sleeve tubes, bulbs, cover plates, or reflector carriers for lamps and radiators in the ultraviolet, infrared, and visible spectral range; in chemical apparatus construction or in semiconductor manufacture in the form of reactors and apparatus of quartz glass for the treatment of semiconductor components, jigs, bell jars, crucibles, or protective shields; or simple quartz glass components including tubes, rods, plates, flanges, rings, or blocks. For producing special properties, quartz glass is doped with other substances such as titanium, aluminum, boron, germanium, or combinations of those substances.

The field of applied science and engineering concerned with the design and application of optical fibers is known as fiber optics. An optical fiber is a flexible, transparent fiber made by drawing glass (silica) to a diameter slightly thicker than that of a human hair. Optical fibers are used most often to transmit light between the two ends of the fiber and are used widely in fiber-optic communications, where they permit transmission over longer distances and at higher bandwidths (data rates) than wire cables. Fibers are used instead of metal wires because signals travel along them with reduced loss. In addition, fibers are also immune to electromagnetic interference, a problem that plagues metal wires. Fibers are also used for illumination, and are wrapped in bundles so that they may be used to carry images, thus allowing viewing in confined spaces, as in the case of a fiberscope. Specially designed fibers are also used for a variety of other applications, such as fiber optic sensors and fiber lasers.

Optical fibers typically include a transparent core surrounded by a transparent cladding material with a lower index of refraction. Light is kept in the core by the phenomenon of total internal reflection which causes the fiber to act as a waveguide. Fibers that support many propagation paths or transverse modes are called multimode fibers; those that support a single mode are called single-mode fibers.

An optical fiber is generally fabricated in two, separate processes. First, a preform rod is prepared and then a preform is fabricated by a rod-in-tube (RIT) or overcladding rod-in-cylinder (RIC) process. Second, an optical fiber is fusion-drawn from the fabricated preform. A conventional process and apparatus for producing the optical fiber preforms, completing the first of the two processes, is disclosed in U.S. Pat. No. 6,053,013 issued to Oh et al.

Specifically, Oh et al. provide an optical fiber rod overcladding apparatus. The overcladding apparatus includes a vertical lathe, a chuck installed in each end of the vertical lathe, a carriage in the vertical lathe for vertically moving between both ends of the vertical lathe, an oxygen-hydrogen burner installed in the carriage, a furnace installed in the carriage, a vacuum pump provided at an end of the vertical lathe, a coupler for connecting the vacuum pump to the end of the vertical lathe, and a controller outside the vertical lathe for controlling the vertical movement of the carriage, the flow rate of the oxygen-hydrogen burner, and the rotation of the chucks. The furnace preheats or heats a glass tube to overclad a preform rod with the glass tube. The patent issued to Oh et al. in the year 2000.

More recently, preforms for quartz glass tubing, rods, or collapsed offline rods-in-cylinders (ORICs) have been produced by introducing a quartz glass component (e.g., a cylinder, an ingot, or an uncollapsed RIC) into an apparatus including a heating zone (e.g., a furnace) in a vertical orientation such that the lower end begins to soften and form a strand. The strand is then placed in a pulling device including one or more sets of pulling wheels. The rate of draw of the strand is controlled by the speed of the pulling wheels, which may apply either a downward or an upward force depending on the forming zone temperature or viscosity and the weight of the strand supported by the wheels. Forming is accomplished without the aid of a die. Thus, the strand dimensions are controlled by the feed rate of the quartz glass component, the temperature of the heating zone, and the speed of the pulling wheels.

The pulling phase can be improved if an end of the quartz glass cylinder to be elongated is welded to an attachment piece in the form of a dummy tube or holder with a smaller diameter. This piece can shorten the pulling process and reduce the loss of material at the same time. Generally, a component of quartz glass that serves as a holder is welded to the upper end of the quartz glass cylinder to be elongated—although holders can be welded to the lower end or to both ends of the cylinder.

A method suited for producing such an assembly is described in International Publication Number WO 2007/039426 filed on behalf of Heraeus Tenevo GmbH. To butt weld a quartz glass tube, which serves as a preform for an optical fiber, to a dummy tube or holder, the front surfaces to be connected to each other can be chamfered before the formation of the melt connection. The connection surfaces are softened by using a propane/oxygen burner or an electrically heated furnace and the connection surfaces are then pressed against each other.

U.S. Pat. No. 6,484,540 issued to Shimada et al. and assigned to an assignee of the subject application, Heraeus Quarzglas GmbH & Co. KG, discloses a method for welding a dummy tube to a quartz glass tube for use as an optical fiber preform. The method includes chamfering the inner edge portion of the dummy tube and/or of the quartz glass tube before welding the quartz glass tube with the dummy tube. The dummy tube and the quartz glass tube are then melt welded together.

U.S. Pat. No. 8,161,772 issued to Sattmann and assigned to Heraeus Quarzglas GmbH & Co. KG discloses a method for the production of an optical component made from quartz glass. A coaxial arrangement with a core rod surrounded by a quartz glass envelope tube is introduced in the vertical direction into a heating zone, softened in the heating zone by sections and, with formation of a drawing bulb, elongated to yield the quartz glass component. A core rod is used that has at least two separate core rod sections arranged one above the other and the weight of an upper core rod section is supported by a mounting or support region of the envelope tube, provided above the drawing bulb.

There is a significant difficulty in producing larger outside diameter preforms close to the original cylinder or cladding size with the conventional downward draw systems and processes. A significant amount of good preform glass is wasted at the start-up of the process and the geometry and waveguide properties of the preform are far from required specifications in terms of such parameters as geometry, clad-to-core ratio, and bow. Thus, the conventional preform systems and processes have distinct drawbacks.

SUMMARY

To solve the problems inherent in conventional preform manufacturing processes, a first object of an apparatus and related process of using that apparatus for producing an optical fiber preform (or an optical fiber) is to produce a solid weld seam in an exact and reproducible manner between quartz glass components to be joined, with impurities being largely avoided. A second object is to minimize, and perhaps eliminate, the wastes and assembly problems inherent in conventional systems and processes. A third object is to provide a simple, operationally reliable, and relatively inexpensive apparatus for producing a welded joint between quartz glass components, which apparatus is particularly suited for carrying out the related process.

A further object is to provide a welding process which results in a high welding strength and which does not cause contraction of the inner diameter of the welded portion. A still further object is advantageously to weld ultra-high ratio cylinders. A related object is to weld cylinders with an outside diameter-to-inside diameter ratio greater than about 3.2 while reducing, if not eliminating, the risk of stress, cracks, and breakage—especially during cool down.

It is also an object to use finite element modeling to develop efficiently the optimum recipe parameters for the weld process. A related object is to save precious production capacity by reducing the number of trials necessary during development. Still another related object is to allow an exact understanding of the complex thermal physics of heating and glass flow, particularly at the two ends of the preform where the final amounts of good preform and optical fiber yield can be "squeezed" out.

To achieve the above objects, there is provided an apparatus and related process of using that apparatus to create a high-strength weld seam in the center of a weld zone between two glass components. Each glass component has a first end, an opposing second end, and a ground surface. The apparatus includes a first chuck configured to clamp the first end of the first glass component and a second chuck configured to clamp the first end of the second glass component, the first chuck and the second chuck moving the glass components toward each other. Further included in the apparatus is an enclosure, preferably a brick house enclosure, in which the second end of the first glass component and the second end of the second glass component are moved toward each other, heated, softened, and welded together to form the weld seam in the weld zone, the brick house enclosure having layers of stacked quartz glass bricks and allowing the weld zone to cool slowly and avoid stress in the weld zone. Still further included in the apparatus is at least one propane quartz melting torch directing a flame inside the brick house enclosure and toward the second ends of the glass components as the glass components move toward each other, the flame softening the second ends of the glass components and creating substantially smooth polished surfaces in the weld zone proximate the second end of each glass component having an increased hydroxide content. At least 80% of the weld zone has a hydroxide content greater than about 10 ppm average in a 10 µm depth from the surface and the tensile strength of the weld zone is greater than about 10 MPa.

The related process creates a high-strength weld seam in the center of a weld zone between two glass components of a welded assembly. The process includes the following steps: (a) providing two glass components each having a first end, an opposing second end, and a ground surface; (b) clamping the first end of each glass component in the respective chucks of a lathe; (c) moving the glass components towards each other using the lathe into a brick house enclosure in which the second end of the first glass component and the second end of the second glass component are heated, softened, and welded together to form the weld seam in the weld zone, the brick house enclosure having layers of stacked quartz glass bricks and allowing the weld zone to cool slowly and avoid stress in the weld zone; (d) jointly and simultaneously heating and softening the second end of the first glass component and the second end of the second glass component in the brick house enclosure using at least one propane quartz melting torch directing a flame inside the brick house enclosure and toward the second ends of the glass components as the glass components move toward each other, the flame creating substantially smooth polished surfaces in the weld zone proximate the second end of each glass component having an increased hydroxide content; (e) pressing the softened second ends of the glass components against each other to form the weld seam in the weld zone of the welded assembly; and (f) cooling the welded assembly to ambient temperature. Again, at least 80% of the weld zone has a hydroxide content greater than about 10 ppm average in a 10 µm depth from the surface and the tensile strength of the weld zone is greater than about 10 MPa.

It is to be understood that both the foregoing general description and the following detailed description are exemplary, but are not restrictive, of the invention.

BRIEF DESCRIPTION OF DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 4b is a front view of the muffle tube shown in FIG. 4a;

FIG. 5b is a side view of the brick house enclosure shown in FIG. 5a;

FIG. 8b is a side view of the paddle illustrated in FIG. 8a;

FIG. 9b illustrates the roughness and the surface hydroxide values along the central axis for the cylinders shown in FIG. 9a;

DETAILED DESCRIPTION

Figure 1:
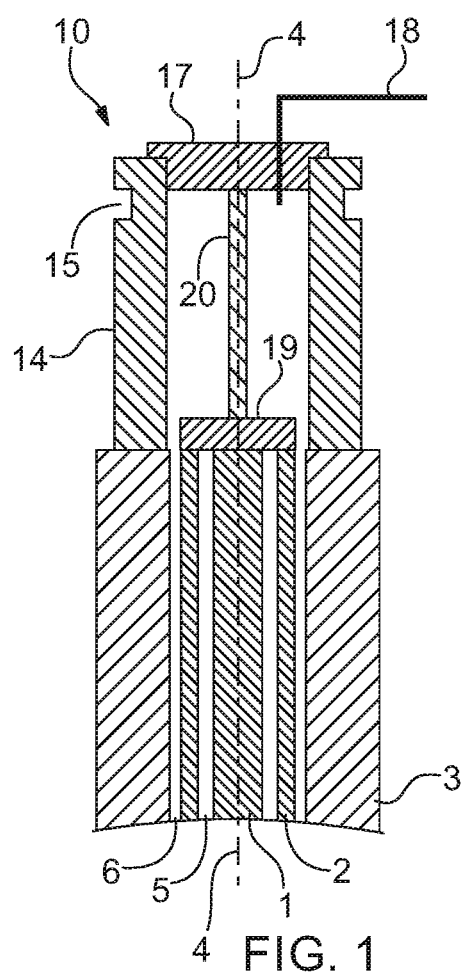
FIG. 1 is an overall view of one embodiment of a coaxial arrangement consisting of a core rod, an inner jacket tube, and an outer jacket tube to which a holder is affixed for forming a preform.

Referring now to the drawing, in which like reference numbers refer to like elements throughout the various figures that comprise the drawing, FIG. 1 shows an apparatus 10 for producing an optical fiber preform (or an optical fiber) according to one embodiment. The apparatus 10 includes a glass core rod 1 that forms the waveguiding optical fiber core placed inside a glass cladding. More particularly, the cladding is preferably formed over the core rod 1 to radially surround the core rod 1. The cladding may be formed of a single tube or, as illustrated in FIG. 1, of an inner tube 2 and an outer tube 3 of glass. The longitudinal axes of the core rod 1, the inner tube 2, and the outer tube 3 extend each in a direction coaxial to a vertically oriented central axis 4 of the overall apparatus 10. A first gap 5 exists initially between the core rod 1 and the inner tube 2; a second gap 6 exists initially between the inner tube 2 and the outer tube 3. The cladding has an outside diameter "OD."

The cladding may be pure quartz glass or a doped quartz glass having a $SiO_2$ content of at least 85%. Preferably, however, the cladding is high purity quartz glass. The core rod 1 is preferably a mostly pure quartz glass. Quartz glass is distinguished by a low coefficient of thermal expansion, by optical transparence over a wide wavelength range, and by high chemical and thermal resistance. High-purity quartz glass is defined to be a quartz glass whose total content of the impurities Li, Na, K, Mg, Ca, Fe, Cu, Ni, Cr, and Mn is less than 10 ppm by weight.

The cladding and the core rod 1 may each be formed by any suitable process, such as fused quartz or one or more types of chemical vapor deposition (CVD), including inside vapor deposition, outside vapor deposition, and vapor axial deposition. The material of the core rod 1 typically has a refractive index which is greater than the refractive index of the material in the surrounding cladding to enable internal reflection of light signals passing through a fiber drawn from the preform, resulting in an efficient waveguide.

Returning to FIG. 1, a first holder 14 (sometimes called a "dummy tube") is joined, fused, or welded (collectively, "welded") to the upper end of the outer tube 3. The first holder 14 typically is a cylinder made of quartz glass of a lesser quality and lesser cost (such as a quartz glass containing a larger amount of impurities, bubbles, and the like) than either the core rod 1 or the cladding. The first holder 14 is typically thinner, has a smaller outer diameter, and has an inner diameter approximately equal to the core rod 1 or the cladding. The first holder 14 has a surrounding rectangular groove 15 which serves as a receiver for a gripper (not shown in the figure) by which the outer tube 3 is held and moved. The gripper is gimbaled, so that the outer tube 3 can pivot about the gimbal mounting in a direction transverse to the central axis 4, which contributes to a self-centering during the elongation process.

The upper end of the first holder 14 is closed with a lid 17 through which a gas line 18 is passed, through which the inner bore of the outer tube 3 and thus also the inner bore of the inner tube 2 can be evacuated, and through which a purging gas can be introduced. A further quartz glass piece 19 is positioned on the upper ends of the core rod 1 and the inner tube 2. The piece 19 also has slots or bores for passing the vacuum through the piece 19 and into the inner bore of the inner tube 2. A support rod 20 which prevents the core rod 1 from floating during the elongation process extends between the piece 19 and the lid 17.

Figure 2:
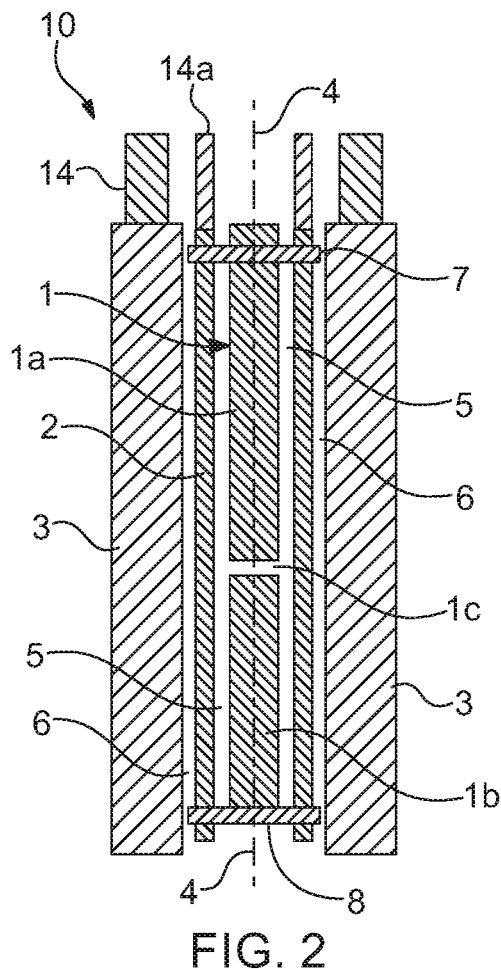
FIG. 2 is an overall view of another embodiment of a coaxial arrangement consisting of a core rod, an inner jacket tube, and an outer jacket tube, with separate holders affixed to the inner jacket tube and the outer jacket tube, for forming a preform.

An alternative embodiment of the apparatus 10 is illustrated in FIG. 2. In contrast to FIG. 1, the embodiment according to FIG. 2 shows the core rod 1 split into an upper core rod section 1a and a lower core rod section 1b separated by a small opening 1c. Each of the upper core rod section 1a and the lower core rod section 1b may have a length of about 3 m. This embodiment permits a suspended mounting of the upper core rod section 1a on the inner tube 2. The inner tube 2 is held by a second holder 14a of quartz glass joined, fused, or welded to the upper end of the inner tube 2. Otherwise, the configuration of the second holder 14a with respect to the inner tube 2 is similar to the configuration of the first holder 14 with respect to the outer tube 3. Thus, the embodiment of the apparatus 10 shown in FIG. 2 illustrates that multiple holders can be affixed to multiple glass components during the process of manufacturing an optical preform.

The suspended mounting of the upper core rod section 1a is achieved by a quartz glass pin 7 which extends at the upper end of the inner tube 2 through its wall and through the upper end of the upper core rod section 1a. To this end, the upper core rod section 1a is provided in a cold state with a fitting bore ensuring some pivotability around the pin axis. The lower core rod section 1b rests on a further quartz glass pin 8 which extends at the lower end of the inner tube 2 through its wall. The small opening 1c remains between the core rod sections 1*a*, 1*b*. Vacuum tightness of the inner bore of the inner tube 2 is ensured by the outer tube 3.

Further embodiments (not shown) of the apparatus 10 include some aspects of the embodiment illustrated in FIG. 1 and some aspects of the embodiment illustrated in FIG. 2. For example, rather than the suspended mounting of the upper core rod section 1*a* characteristic of the embodiment illustrated in FIG. 2, a further embodiment replaces the pins 7, 8 with the lid 17, piece 19, and support rod 20 characteristic of the embodiment illustrated in FIG. 1. Thus, the upper ends of the first holder 14 and the second holder 14*a* are closed with the lid 17 (through which the gas line 18 optionally may pass, through which the inner bore of the outer tube 3 and thus also the inner bore of the inner tube 2 may be evacuated, and through which a purging gas may be introduced). The piece 19 is positioned on the upper end of the upper core rod section 1*a* only, unlike the embodiment illustrated in FIG. 1, and not on the upper end of the inner tube 2 to which the second holder 14*a* is affixed. The support rod 20 prevents the upper core rod section 1*a* from floating during the elongation process and extends between the piece 19 and the lid 17.

In another embodiment (not shown), the first holder 14 (or an alternative holder) can be affixed to the core rod 1. Thus, separate holders can be affixed, respectively, to the core rod 1, the inner tube 2, and the outer tube 3. Two holders can be affixed to the core rod 1, one holder on each end of the core rod 1, in yet another embodiment (not shown).

Regardless of the embodiment, the apparatus 10 typically has a lower open end; a pre-heating insulation zone; a heating zone; a post-heating cooling, annealing, and oven gas purging zone; and an upper open end opposing the lower open end. The heating zone can preferably be heated to temperatures of 500° C. to 2,300° C., and more preferably 1,000° C. to 2,300° C., and still most preferably 1,500° C. to 2,300° C., by a heating element (typically an oven or furnace). More particularly, the heating element is preferably of an annular configuration. The heating element forms the heating zone of the apparatus 10. An inert gas is injected into the heating element at a high temperature to prevent oxidation from occurring on the outer surface of the preform and enhance uniform heat temperature distribution on the outer surface of the preform due to its excellent thermal conductivity.

The process of manufacturing a preform using the apparatus 10 is explained with reference to FIG. 1. The glass assembly, which includes the core rod 1 and the cladding, is heated, softened, and elongated to form an optical component, such as an optical fiber preform or an optical fiber. More particularly, the glass assembly progresses in an upward (or downward) direction through the apparatus 10 where the glass assembly is heated in a zone-wise manner in the heating zone. A preform is continuously created by melt deformation (and optionally stretching/elongation by pulling or compressing forces during the process).

In one embodiment, the glass assembly is a coaxial assembly of two separate glass components: the core rod 1 and the cladding. More particularly, the core rod 1 is in the form of a solid, cylindrical rod and the cladding is in the form of a single hollow overclad cylinder or, as illustrated in FIG. 1, two hollow overclad cylinders including the inner tube 2 and the outer tube 3 surrounding the core rod 1 (i.e., a rod-in-cylinder assembly). In the coaxial assembly, the core rod 1 and the cladding are not fused together before the glass assembly enters the heating zone.

As the coaxial assembly of this embodiment of the glass assembly progresses through the apparatus 10, the core rod 1 and the cladding are heated to a predetermined temperature sufficient to cause the two glass components to soften and fuse together to form an integral glass body. (By "predetermined" is meant determined beforehand, so that the predetermined characteristic must be determined, i.e., chosen or at least known, in advance of some event. By "integral" is meant a single piece or a single unitary part that is complete by itself without additional pieces, i.e., the part is of one monolithic piece formed as a unit with another part.) More particularly, as successive portions of the multiple-piece glass assembly approach the heating zone and are heated in the heating zone, the cladding and the core rod 1 become softened and the softened cladding collapses on and fuses with the core rod 1. At least one, and more preferably a plurality of preforms, or an optical fiber, may then be drawn from the resulting monolithic glass body.

Preferably, the coaxial arrangement of this embodiment of the assembly is heated to temperatures of 500° C. to 2,300° C., and more preferably 1,000° C. to 2,300° C., and most preferably 1,500° C.-2,300° C. More preferably, softening and collapsing of the cladding on the core rod 1 occurs at a temperature of 1,000° C. to 2,200° C., and more preferably 1,300° C. to 2,000° C., and most preferably 1,600° C. to 1,800° C. Fusing together of the softened and collapsed cladding with the softened core rod 1 preferably occurs at a temperature of 1,000° C. to 2,200° C., and more preferably 1,300° C. to 2,200° C., and most preferably 1,600° C. to 2,200° C. Those skilled in the art will understand, however, that other factors, such as glass material composition and throughput also affect the temperature at which the cladding will collapse on and fuse with the core rod 1.

The present disclosure focuses on the welding process used to attach two quartz glass components as described above. The welding process includes the steps of clamping both quartz glass components in a lathe, moving the quartz glass components towards each other using the lathe, the joint and simultaneous heating and softening of the faces of both quartz glass components and the subsequent pressing of the softened faces against each other to form a component assembly having a weld seam, and cooling the component assembly to ambient temperature. If necessary, a graphite paddle is pressed against the softened outer surface and the surface is shaped in this process—especially if two cylinders of the same diameter are welded together.

When quartz glass components are welded, impurities may be formed or released from the ambient atmosphere, the heating burner, or from boundary walls. The impurities may deposit on the quartz glass components to be joined and particularly on the softened connection surfaces. These impurities are harmful and may lead to bubbles or other flaws on boundary surfaces or even to breakage during further processing of the glass assembly. Moreover, during welding an undesired plastic deformation is likely to occur in the area of the melting zone. Although the deformation might be eliminated by troublesome mechanical reworking, dimensional deviations are normally found. Such plastic deformations are promoted by irregular and undefined heating conditions during the welding process.

Figure 3A:
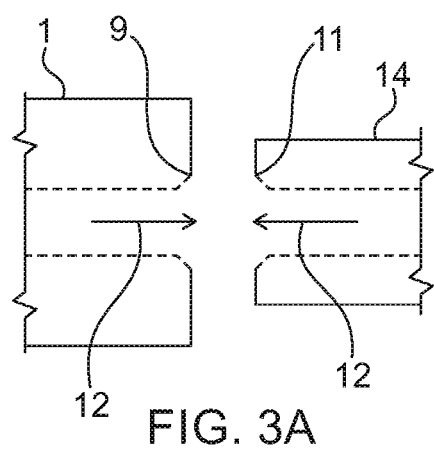
FIGS. 3a and 3b illustrate chamfered edges of both the cylinder for use as the preform and the holder, before those two components are affixed in FIG. 3a and after they are affixed in FIG. 3b.
Figure 3B:
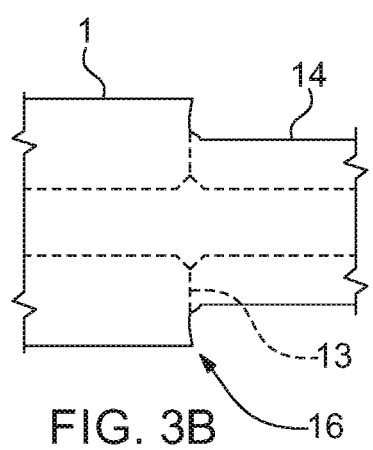

It has been found helpful, in some applications requiring a welding process to attach two quartz glass components together, to chamfer the ends of the components. Returning to the apparatus 10, FIGS. 3*a* and 3*b* illustrate chamfering the edge portions of both the core rod 1 for use as the preform and the first holder 14 (or, more generally, the edge portions of any glass component and any holder to be affixed to that glass component). The core rod 1 having the chamfer 9 and the first holder 14 having the chamfer 11 are illustrated in FIG. 3a before those two components are affixed (preferably by welding) and, in FIG. 3b, after they are affixed along the weld seam 13. The relatively low cost first holder 14 is welded to an end of the relatively expensive quartz glass core rod 1 to facilitate transportation, process steps such as melt welding the core rod 1 with the cladding into a monolithic glass body, and the like. Toward those goals, the first holder 14 can be clamped and manipulated without risking damage to the core rod 1.

As shown in FIG. 3a, the chamfered core rod 1 and the chamfered first holder 14 are melt welded together by heating and melting both components and then directly pressing the chamfered edges 9, 11 against each other in the direction of arrows 12 to form the uniform monolithic body 16. The chamfers 9, 11 are heated and melted together by using an oxygen/hydrogen burner, a propane/oxygen burner, or an electric furnace. A welding rod is unnecessary. After welding, if necessary or as desired, the outer surface of the uniform monolithic body 16 can be shaped by pressing the outer circumferential surface using a graphite trowel or paddle or a similar shaping tool.

In one exemplary embodiment, the chamfered glass core rod 1 for use as the preform has an outer diameter of 180 mm and an inner diameter of 50 mm and the chamfered first holder 14 has an outer diameter of 120 mm and an inner diameter of 50 mm. The inner edges on the welding side of both components were subjected to chamfering for a length of 10 mm in the circumferential direction and 10 mm in the longitudinal direction. Although the most beneficial amount of chamfer depends on the inner diameter, the wall thickness, and other dimensions of the core rod 1 and the first holder 14, a suitable amount of chamfer is about 2 mm or more but not more than 30% of the wall thickness.

After the chamfers 9, 11 were formed, the edges on the welding side of the core rod 1 for use as the preform and the first holder 14 were made molten by heating for about 20 minutes while maintaining the predetermined calorific value, positional relation, etc., and the edges were pressed against each other as indicated by the direction arrows 12 in FIG. 3a. The inner diameter of the thus-obtained monolithic body 16 was 50 mm, which was found to maintain the original inner diameter of both the core rod 1 and the first holder 14. On performing a static load tensile strength test, it was found that no breakage occurred in the weld seam 13 even when the maximum testing load of 3 tons (or about 6,000 pounds) was applied.

As the exemplary embodiment indicates, the chamfers 9, 11 allow the core rod 1 and the first holder 14 to be welded together at a weld seam 13 having a high welding strength with minimal risk of breakage at the weld seam 13. The chamfers 9, 11 also allow the core rod 1 and the first holder 14 to form the monolithic body 16 without contraction of the substantially constant inner diameter of the core rod 1 and the first holder 14 (50 mm in the example) even if expansion occurs attributed to the pressing applied during welding. The chamfers 9, 11 can be formed by a linear chamfering process known as "C-type chamfering." Alternatively, a similar effect can be obtained by a non-linear chamfering known as "R-type chamfering." C-type chamfering is preferred because it reduces the operational load such as processing.

A variety of conventional welding processes exist to generate the heat needed to attach glass tubes and preforms. Four such processes are described in sequence. First, a hydrogen burner has been used in combination with a glass working lathe without a quartz glass muffle. This configuration heats a smaller area than other processes and creates a stress band close to the weld. Because hydrogen burners offer limited power, applications with large power demands require multiple burner assemblies. In turn, multiple burner assemblies would require large openings in a muffle enclosure and, therefore, it is impractical to shield the cylinder properly. In addition, absent a muffle the welded components cool quickly, creating high stresses and rendering the configuration unsuitable for ground cylinders. No hydrogen burner configuration that is currently available has an acceptable size and low complexity adequate to weld cylinders having a 200 mm outside diameter and certainly not up to a 230 mm outside diameter. Glass complements (e.g., preforms, tubes, and the like) welded with this first conventional process typically have polished surfaces.

A second conventional welding process uses a plasma welding lathe in combination with a glass working lathe without a quartz glass muffle. This configuration also has a power limitation: currently class components having a maximum 150 mm outside diameter can be welded. The configuration does not permit access to the weld during welding and, therefore, smoothing of the weld with a paddle is impossible. A small circumferential groove at the weld acts as a stress concentration point, reducing the weld strength. Disadvantages of this second conventional welding process include high cost, an expensive lathe and power supply, the requirement of a high automation grade, and inaccessibility to the room during welding.

A third conventional welding process uses a laser. Laser equipment tends to be expensive, can be difficult to operate, and requires high maintenance costs. Sophisticated personnel skills and qualifications are required of laser operators. Further, laser welding is limited to glass components having diameters smaller than 150 mm. Because high stresses are induced at the weld, offline tempering is required to avoid occupying the expensive laser equipment for excessive periods of time. Still further, cuts made at the ends of the cylinder and handle must be highly accurate to enable laser welding (i.e., only extremely small gaps between the components are permitted).

The fourth conventional welding process uses a furnace such as a resistance furnace or an induction furnace. Such furnaces generate high equipment costs and are difficult to implement on a lathe. Because the weld is not visible or accessible during welding, it is almost impossible to guarantee tight specifications for weld dimensions. The furnace length also makes it difficult to weld shorter components for special applications. Furnaces can be oriented either horizontally or vertically; each orientation has disadvantages. Vertically oriented furnaces have higher equipment and building costs and are difficult to load. Horizontally oriented furnaces risk contamination from the furnace parts themselves (oxidation particles can fall onto glass surfaces) and render proper sealing of the furnace more difficult (ZrO or ceramic heaters increase contamination risk).

Figure 4A:
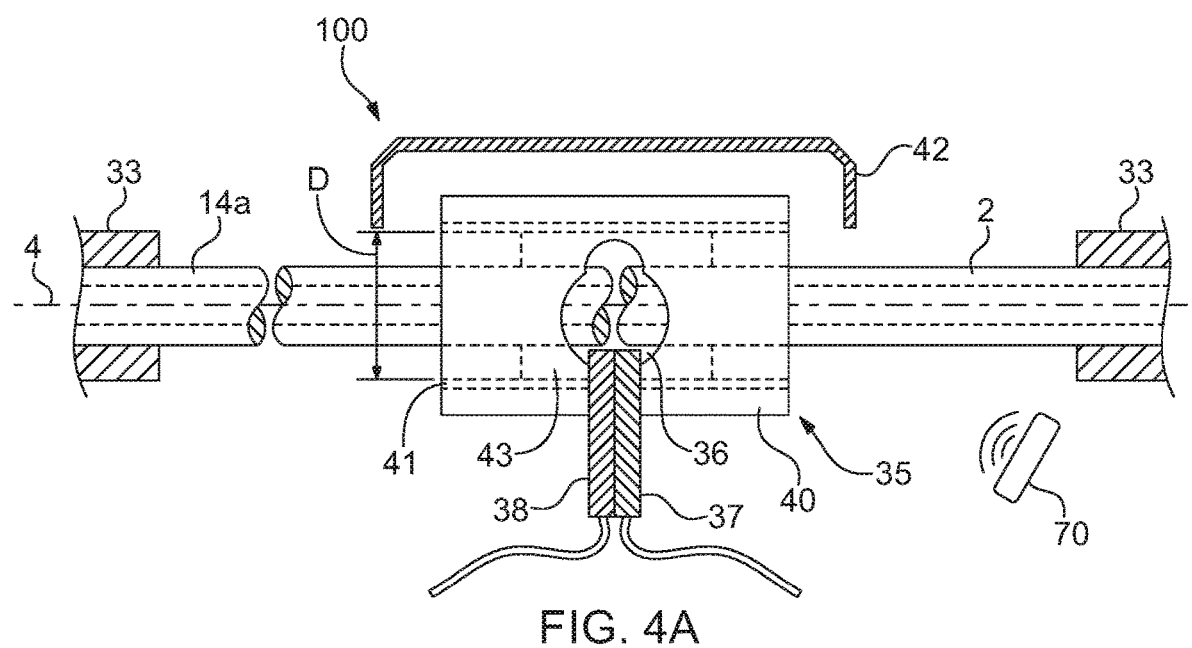
FIG. 4a is a side view of an embodiment of the apparatus with an enclosure in the form of a muffle tube.
Figure 4B:
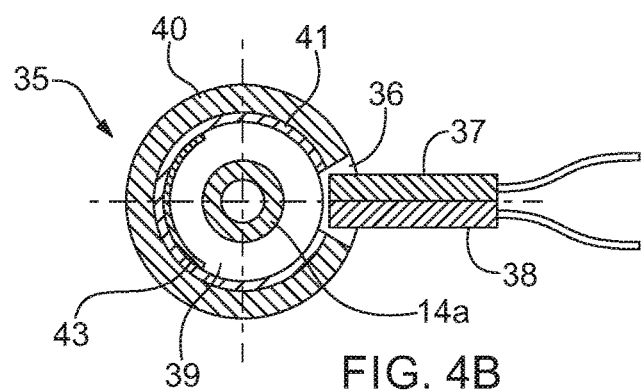

A description follows of an improved apparatus, and related process of using that apparatus, to generate the heat needed to attach (e.g., weld) glass tubes and preforms. The improved apparatus and related process yield an optical fiber preform by producing a solid weld seam in an exact and reproducible manner between quartz glass components to be joined, with impurities being largely avoided. FIG. 4a is a side view of an embodiment of the apparatus 100 with an enclosure 35 in the form of a muffle tube. FIG. 4b is a front view of the enclosure shown in FIG. 4a. This embodiment of the apparatus 100 enhances the welding method for joining a first and at least one second glass component by forming an integral bond between connection surfaces of the components as the components are heated and softened in the area of the mutual connection surfaces within the enclosure 35. As for the embodiments described above, and as an example, the second holder 14a is to be melt welded to the hollow inner tube 2 of the cladding to facilitate transportation, processing, and the like. Then, using the second holder 14a, the inner tube 2 is to be elongated into a preform for optical fibers or directly into the optical fiber in combination with the core rod 1, which is inserted into the inner bore of the hollow inner tube 2.

The apparatus 100 includes a lathe having a set of chucks 33. One chuck 33 clamps the second holder 14a and the other chuck 33 clamps the inner tube 2 so that longitudinal axis of each of the second holder 14a and the inner tube 2 lies along the common central axis 4. In other words, the second holder 14a and the inner tube 2 are coaxial to each other and their respective front edges to be welded are opposite each other. The opposite areas of the second holder 14a and the inner tube 2 including the front edges to be welded are heated and softened inside the enclosure 35.

In one embodiment, the enclosure 35 is configured as a three-part member and is open at both sides. The central part is provided in its lateral wall with an opening 36 through which two heating burners or torches 37, 38 project into the interior 39. (In an alternative embodiment, of course, one or more heating torches 37 may be arranged entirely inside the enclosure 35.) As illustrated in FIGS. 4a and 4b, the heating torches 37, 38 are parallel to one another. The particular application will dictate both the number of heating torches 37, 38 (one, two, or more) and how they are arranged. A non-parallel arrangement of the heating torches 37, 38 around the wall of the enclosure 35 in the area of the front edges to be welded distributes the heat of the heating torches 37, 38 over a larger area of the enclosure 35, resulting in a smaller thermal load on the enclosure 35. The heating torches 37, 38 also may be positioned opposite each other on the interior 39 of the enclosure 35.

The lathe can be operated with or without rotation. Typically, however, the second holder 14a and the inner tube 2 are rotated about the common central axis 4. Rotation of the second holder 14a and the inner tube 2 can be achieved, for example, by rotating the chucks 33. Such rotation ensures even heating around the circumference of the second holder 14a and the inner tube 2, especially when the heating torches 37, 38 are located on only one side of the lathe. Rotation can occur during heat up, during cool down, or, preferably during both heat up and cool down. The rotation speed is an important parameter. Typically, the rotation speed range is between 0 to 100 rpm. A preferred rotation speed range is 30 to 50 rpm.

In one embodiment, the enclosure 35 has a tubular body 40 of opaque quartz glass, which is commercially available under the registered trademark Rotosil® from Heraeus Quarzglas GmbH & Co. KG, with a round cross-section. The inner side of the body 40 which faces the interior 39 may be lined with an inner layer 41 having a layer thickness of 10 mm to 12 mm, which is formed from high-quality quartz. The round cross-section of the interior 39 facilitates a heating profile that is coaxial to the central axis 4, and thus a uniform heating of the second holder 14a and the inner tube 2 which also have a round cross-section. Moreover, the round cross-section simplifies the adjustment of a substantially laminar flushing gas flow (typically an oxygen flow) in the direction of the central axis 4, and dead corners are avoided where impurities or particles may accumulate over the course of time.

The example enclosure 35 has an inner diameter D of about 400 mm and a longitudinal slit along its length which serves as an expansion joint. At the side opposite to the heating torches 37, 38, the interior 39 of the enclosure 35 is covered with a shell-like insertion 43 of high-purity quartz glass, which protects the central part of the enclosure 35 from the heat and which, in addition, enhances the heat capacity of the enclosure 35 and thus makes the temperature distribution inside the enclosure 35 uniform. Provided above the enclosure 35 is a suction device 42 which extends in part along the front openings of the enclosure 35 and removes the hot exhaust gas from the enclosure 35. Supports (not shown in the drawing) of high-purity graphite serve to position and fix the enclosure 35.

The second holder 14a and the inner tube 2 are softened in the enclosure 35 by the heat of the heating torches 37, 38. The enclosure 35 both provides thermal insulation and acts as a heat reservoir. This yields a locally homogeneous and uniform heating profile that has an advantageous effect on the quality of the welded joint and facilitates the reproducible manufacture of the joint. The enclosure 35 reduces the heat loss of the heating torches 37, 38 and also facilitates a defined slow cooling of the components that are welded together, so that thermal stresses that might lead to cracks and breakage of the weld seam 13 are minimized. Moreover, the enclosure 35 substantially shields the interior 39 from the external environment, so that stray particles or other impurities are largely kept away from the heating zone.

A controller is a hardware device or a software program that manages or directs the flow of data (i.e., facilitates communication) between two or more components. The apparatus 100 includes a controller 70. The controller 70 provides the ability to obtain data from, for example, the chucks 33, the enclosure 35, the torches 37, 38, and the suction device 42, and to use that data to control the other components of the apparatus 100 and the related welding process. The controller 70 has programmed in it, in a manner well-known to those skilled in the art, a preset control program or routine to assure efficiently the optimum heating and movement process recipe. The controller 70 helps to assure a robust and reproducible "one button" automated process for production.

Figure 5A:
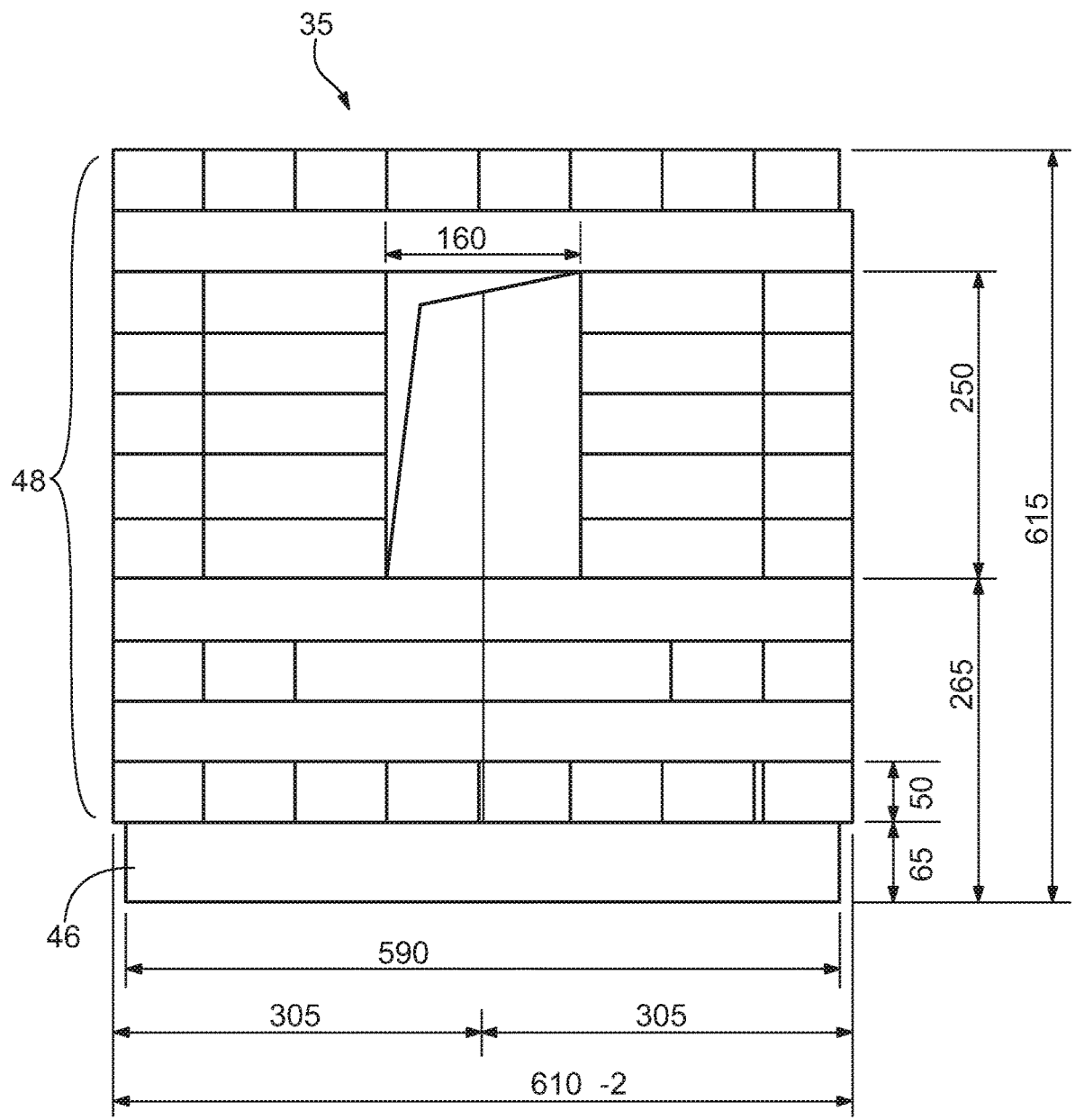
FIG. 5a is a front view of the brick house enclosure installed on the horizontal lathe to prevent the weld seam from cooling too quickly.
Figure 5B:
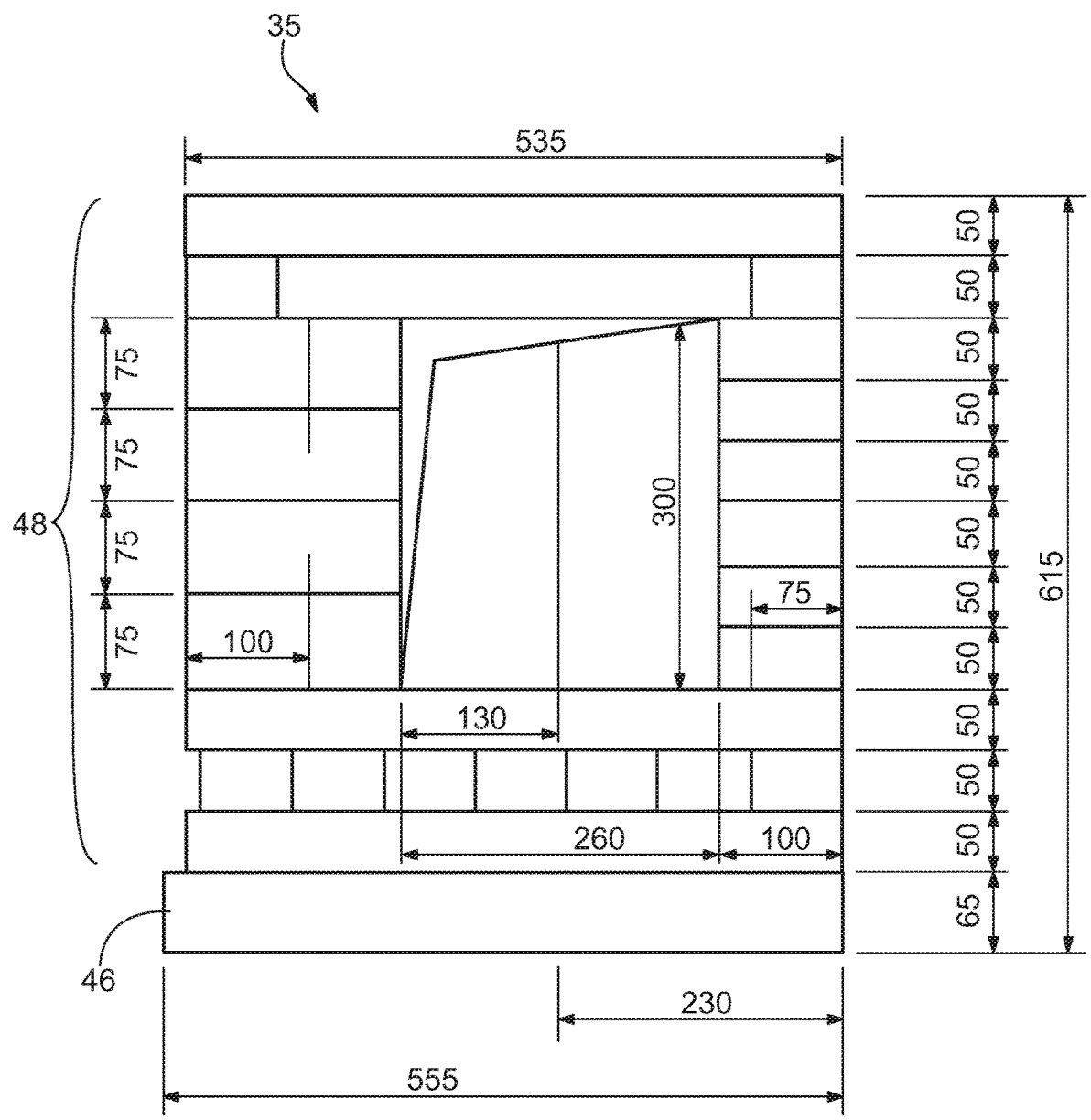

As illustrated in FIGS. 5a and 5b, which depict a front view and a side view, respectively, a specific type of enclosure 35 called a brick house enclosure 35 is preferably installed on the horizontal lathe to prevent the weld seam 13 from cooling too quickly. The brick house enclosure 35 is preferably made of Rotosil® bricks. Most preferably, the Rotosil® bricks are made of grade Opaque Fused Material (OFM) 70. OFM 70 is electrically melted from pure sand. Physically, fused quartz is amorphously solidified silica—inclusions of fine gas bubbles and traces of metal oxides make it white and opaque. Melting is carried out in rotating molds. By this process, the inner contours of the resulting fused silica products are initially formed by centrifugal force alone. The melting heat is provided by internal-burning electric arcs. This process produces axially symmetrical shapes with a very even, dense wall and a fire-glazed inner surface. The wall thickness is determined by the intensity and burning time of the electric arc.

OFM 70 is highly resistant to corrosion, high temperatures, thermal shocks, and electrical influences. The low coefficient of thermal expansion enables rapid heating and cooling. OFM 70 is a highly effective electrical insulator even at very high temperatures. The corrosion resistance of OFM 70 is in itself sufficient to prevent foreign substances from being released from the structure of the material. This characteristic can be even further enhanced by furnishing OFM 70 with an inner lining of pure, transparent fused silica glass, which contains considerably fewer traces of impurities than even OFM 70 itself.

Specific heat capacity (or simply specific heat) is the amount of energy required to raise the temperature of a substance per unit of mass. The specific heat capacity (C) of a material is a physical property commonly measured at constant pressure ($C_p$). In SI units, the specific heat capacity is the amount of heat in joules required to raise 1 kilogram of a substance 1 degree Kelvin and, therefore, is measured in joules per degree kelvin per kilogram (or gram).

The specific heat capacities of substances comprising molecules (as distinct from monatomic gases) are not fixed constants; they vary somewhat depending on temperature. Accordingly, the temperature at which the measurement is made is usually also specified. For example, the specific heat capacity ($C_p$) of silica glass (used to manufacture the brick house enclosure 35) varies with temperature as follows: $C_p$ at 1,000° K=1.17 J/(g*K), $C_p$ at 1,500° K=1.27 J/(g*K), and $C_p$ at 2,000° K=1.49 J/(g*K). The specific heat capacity provides an indication of how much energy will be required to heat or cool an object (such as the brick house enclosure 35) of a given mass by a given amount. In turn, this energy requirement will give information about how long the heating or cooling process will take under a given energy supply, as well as the cost implications of that process.

As illustrated in FIGS. 5a and 5b, the brick house enclosure 35 has a base or first layer 46 made of a graphite plate. A suitable number of layers 48 of Rotosil® bricks are disposed on the first layer 46. Eleven layers 48 of stacked Rotosil® bricks are illustrated in FIGS. 5a and 5b. Suitable dimensions (in millimeters) for the first layer 46 and for the Rotosil® brick layers 48 are also illustrated. The brick house enclosure 35 ensures a heat distribution around the weld seam 13 which allows the proper flame polishing of the weld zone in a reasonable amount of time. Heat and hydroxide are distributed evenly around the handle-to-cylinder weld seam 13. The Rotosil® brick house enclosure 35 allows a slower cool down of the welded material than was previously possible, achieving a cool down rate that yields low stress welds.

Figure 6A:
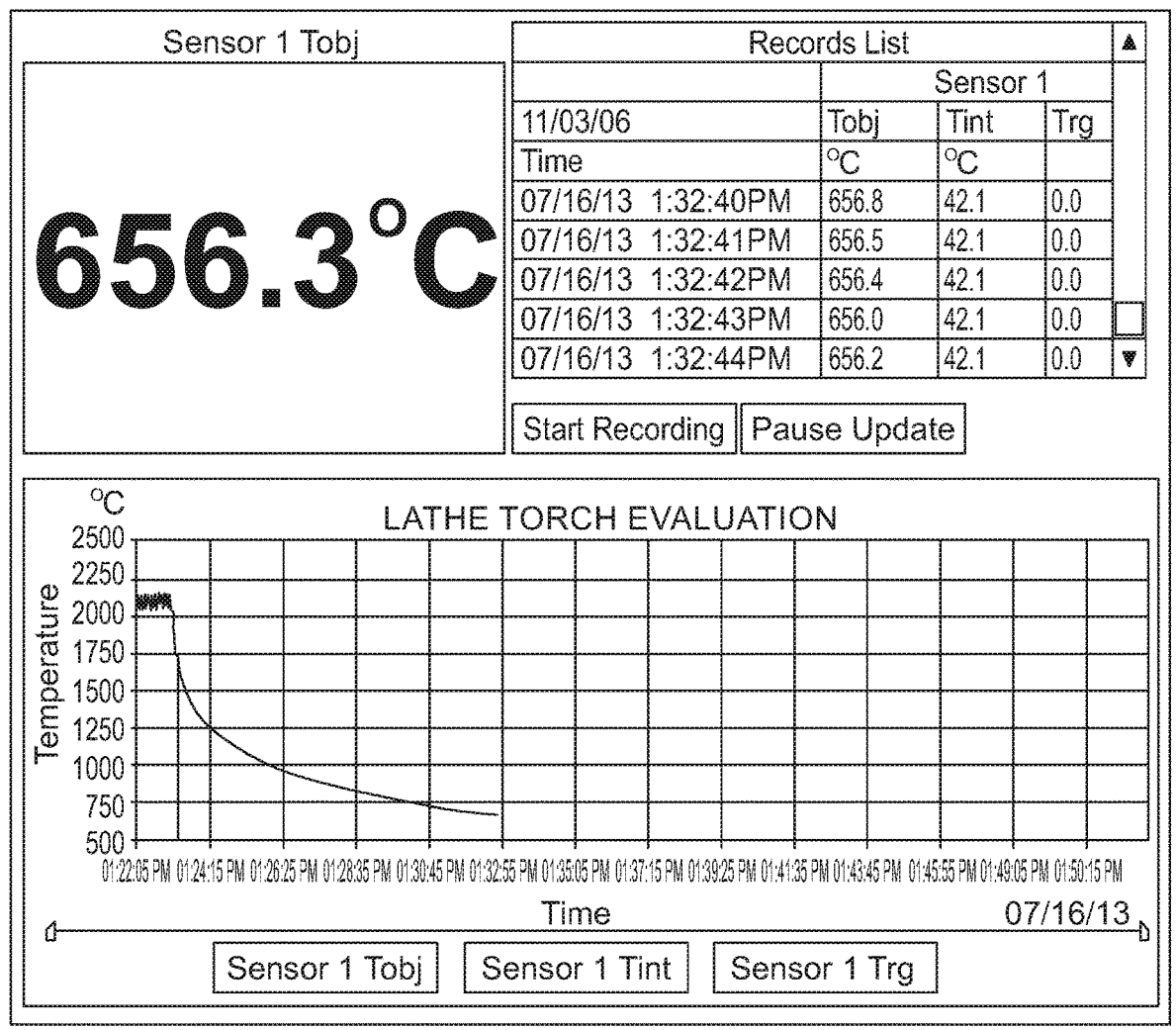
FIG. 6a illustrates cool down of a weld seam without using the brick house enclosure.

FIG. 6a illustrates cool down of the weld seam 13 without using the brick house enclosure 35. As illustrated, the weld seam 13 cooled from about 2,100° C. to about 650° C. More specifically, the weld seam 13 cooled from about 1500° C. to about 900° C. in about 3.33 minutes (a rate of about 180° C. per minute).

Figure 6B:
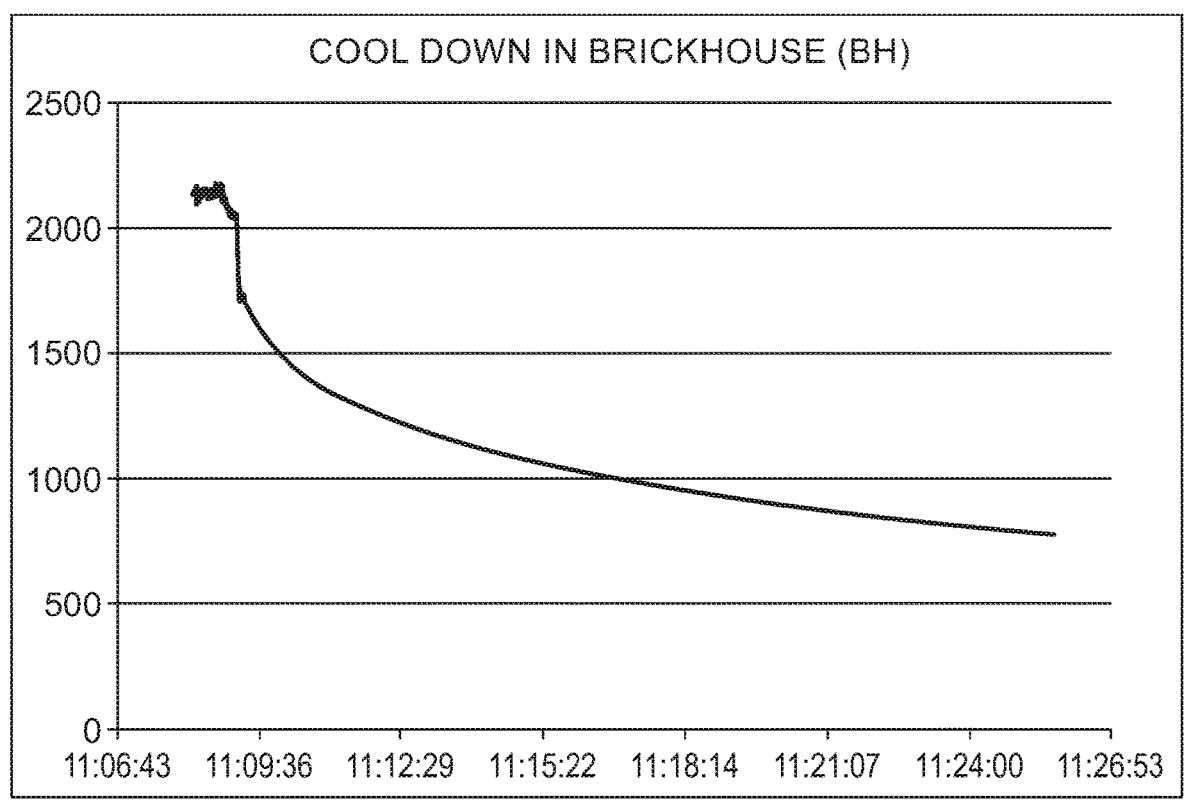
FIG. 6b illustrates, for purposes of comparison, cool down of a weld seam using the brick house enclosure.

FIG. 6b illustrates cool down of the weld seam 13 using the brick house enclosure 35. As illustrated, the weld seam 13 cooled from about 2,100° C. to about 650° C. More specifically, the weld seam 13 cooled from about 1500° C. to about 900° C. in about 10 minutes (a rate of about 60° C. per minute).

A comparison between FIG. 6a and FIG. 6b shows that the cool down rate achieved using the brick house enclosure 35 can be reduced by a factor of about three. Such a slower cool down rate improves the strength of the weld seam 13. The brick house enclosure 35 achieves the optimum ratio between cool down rate and weld cycle time.

The advantageous cool down rate as described above yields low stress welds. The overall strength of the weld seam 13 is sufficiently high that it is possible to weld 200 mm OD cylinders with small inside diameters. Cylinders welded using the disclosed process can have weights up to 250 kg (e.g., OD=210 mm, ID=43 mm, Length=3,400 mm). These cylinders are welded as double cylinders. The batch weight of such assemblies is in the range of about 550 to 600 kg. Conventional welding processes cannot achieve welds of such strength. If the welding process is attempted without the brick house enclosure 35, the breakage rate for cylinders with an OD larger than 150 mm is almost 100%.

The brick house enclosure 35 might be replaced with the quartz glass muffle enclosure 35 described above. But the quartz glass muffle enclosure 35 is significantly more expensive, has a shorter lifetime, and offers less heat capacity than the brick house enclosure 35. The brick house enclosure 35 also might be replaced by wrapping the weld seam 13 with quartz wool. Quartz wool introduces a high risk for contamination at the weld seam 13, however, and introduces a source of quartz fibers in the environment. Neither the quartz glass muffle enclosure 35 nor quartz wool wraps are suitable for high-volume processes.

Figure 7:
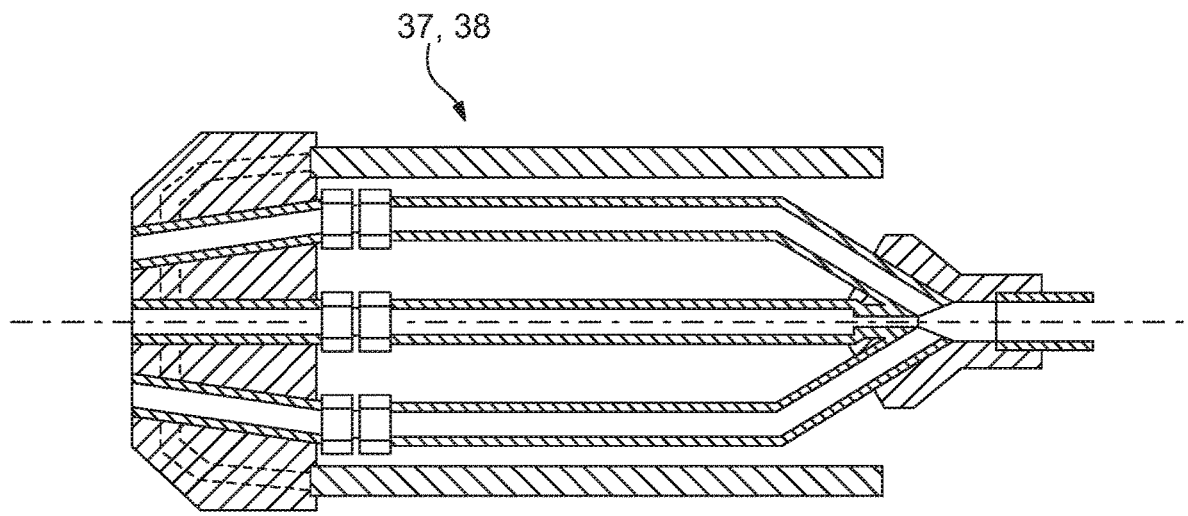
FIG. 7 illustrates a suitable heating torch which provides the heat needed to weld two glass components together inside the enclosure.

Like the brick house enclosure 35, the selection of the torches 37, 38 is also important to the success of the welding process. Each torch 37, 38 must have power adequate to introduce sufficient hydroxide into a depth of about 10 µm. A suitable torch 37, 38 is illustrated in FIG. 7 and is commercially available from Messer Cutting Systems GmbH of Germany. The illustrated torch 37, 38 is a propane-oxygen quartz melting torch with electro polished stainless steel pipes. The torch head is made from materials having good thermal conductivity. Each torch 37, 38 preferably has a power rating of about 120 to 130 kW.

Figure 8A:
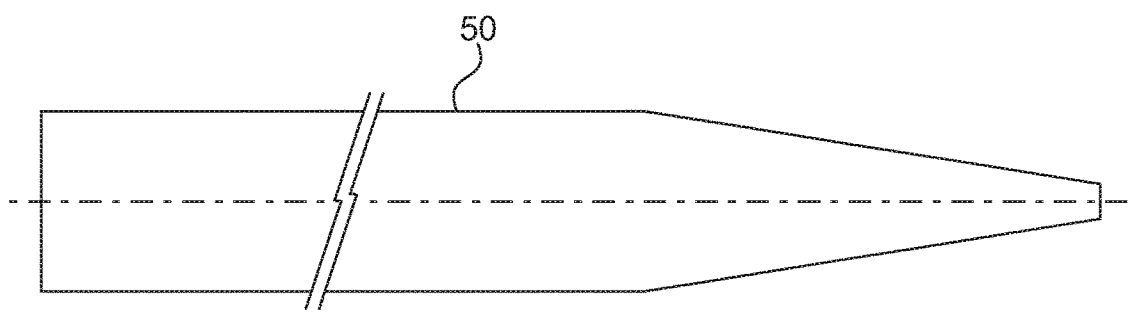
FIG. 8a is a top view of a paddle used to smooth the weld for easier flame polishing with the torch.
Figure 8B:
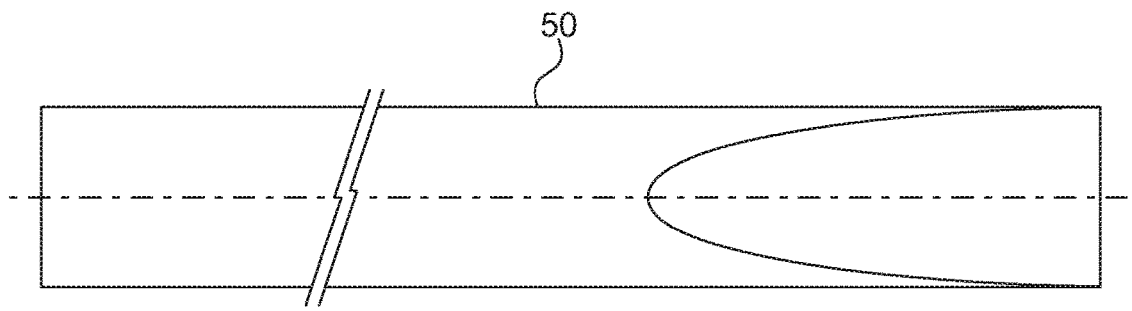

A graphite paddle 50 can be used to smooth the weld for easier flame polishing with the torches 37, 38. Top and side views of a suitable graphite paddle 50 are illustrated in FIGS. 8a and 8b, respectively. An SGL Grade 580 extruded graphite is suitable, with an ash content below about 500 ppm, as the material for the paddle 50.

Figure 9A:
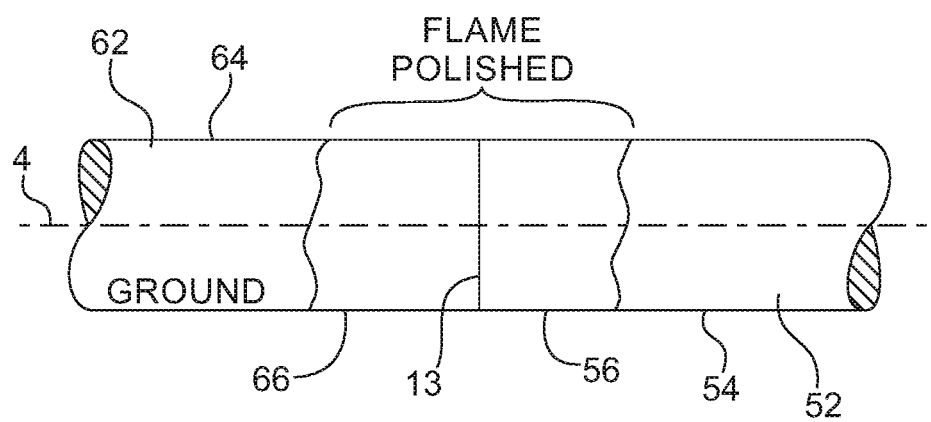
FIG. 9a illustrates two welded hollow cylinders, highlighting ground and flame polished surface regions.
Figure 9B:
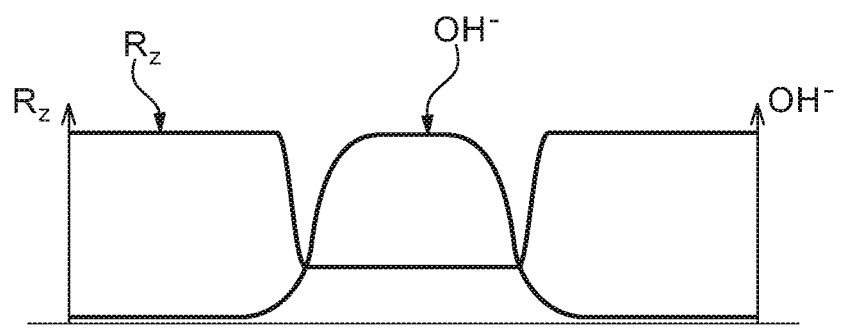

FIGS. 9a and 9b show two welded hollow cylinders 52, 62 and the surface conditions of the cylinders 52, 62. (In one embodiment, the first cylinder 52 might be the second holder 14a and the second cylinder 62 might be the inner tube 2.) The cylinders 52, 62 are coaxially aligned along the central axis 4. Each cylinder 52, 62 has a respective ground surface 54, 64. Unfortunately, there is a well-known negative affect of surface flaws (e.g., induced by grinding) on glass strength. Therefore, in the area of the weld seam 13 located in the center of FIG. 9a and at which the two cylinders 52, 62 are joined, the surface of each cylinder 52, 62 is flame polished by the heat of the torches 37, 38 to create a substantially smooth surface. Thus, each cylinder 52, 62 has a respective flame polished surface 56, 66. The tensile strength of the glass is greatly increased in the flame polished surfaces 56, 66 as compared to the ground surfaces 54, 64.

FIG. 9b shows the roughness and the surface hydroxide values along the central axis 4 for the cylinders 52, 62. Arithmetical mean roughness $R_a$ and ten-point mean roughness $R_z$ are different parameters of roughness. $R_a$ is the average roughness of a surface. $R_z$ is the difference between the tallest peak and the deepest valley in the surface. The profile roughness parameters are included in the BS EN ISO 4287:2000 British standard, identical with the ISO 4287:1997 standard. The roughness of the ground surfaces 54, 64 of the cylinders 52, 62 is $R_z \leq 6$ µm, which decreases in the flame polished surfaces 56, 66 to $R_z \leq 0.3$ µm.

Hydroxide is a diatomic anion that consists of an oxygen atom and a hydrogen atom held together by a covalent bond, carries a negative electric charge, and is represented by the chemical formula $OH^-$. Hydroxide is an important but usually minor constituent of water. Hydroxide often functions as a base, a ligand, a nucleophile, and a catalyst.

The hydroxide value in the bulk material of the cylinders 52, 62 is typically much less than 1 ppm, and for the low hydroxide substrate tube interior less than 0.1 ppm. The cylinders 52, 62 are purged (e.g., with oxygen) during the welding process to prevent the flames from the torches 37, 38 from entering the inside of the cylinders 52, 62; therefore, significantly less hydroxide is implanted on the interior cylinder surfaces. Due to the hydroxide generated in the flame by the combustion of the fuel gas (propane) created by the torches 37, 38, the hydroxide increases in the weld zone above the bulk value. This hydroxide is located in the surface region of the flame polished surfaces 56, 66 and only about 10 µm deep. It is desirable to increase the hydroxide concentration or level in the weld zone proximate the weld seam 13 and defined by the flame polished surfaces 56, 66 to above about 10 ppm and, preferably, in the range of about 20-100 ppm. By later etching away the 10 µm surface region, the hydroxide can be reduced to its original value, namely the specified value of the bulk material.

The higher hydroxide in the flame polished surfaces 56, 66 (about 10 µm deep) of the weld zone reduces the viscosity of the material and hence its brittleness. Along with the reduced roughness, the weld zone actually reaches a higher strength level than the untreated ground surfaces 54, 64 of the cylinders 52, 62, provided that the brick house enclosure 35 is used to minimize stresses by assuring proper cool down rates in the weld zone.

The polishing effect of the torches 37, 38 can be increased by continuing with the flame impact after completion of the actual welding process. Thus, the operation of the torches 37, 38 is continued for a duration of about 5 to 10 minutes to flame polish the weld zone after forming with the graphite paddle 50. Such operation removes any tensile strength-reducing roughness introduced by the paddling process.

Figure 10:
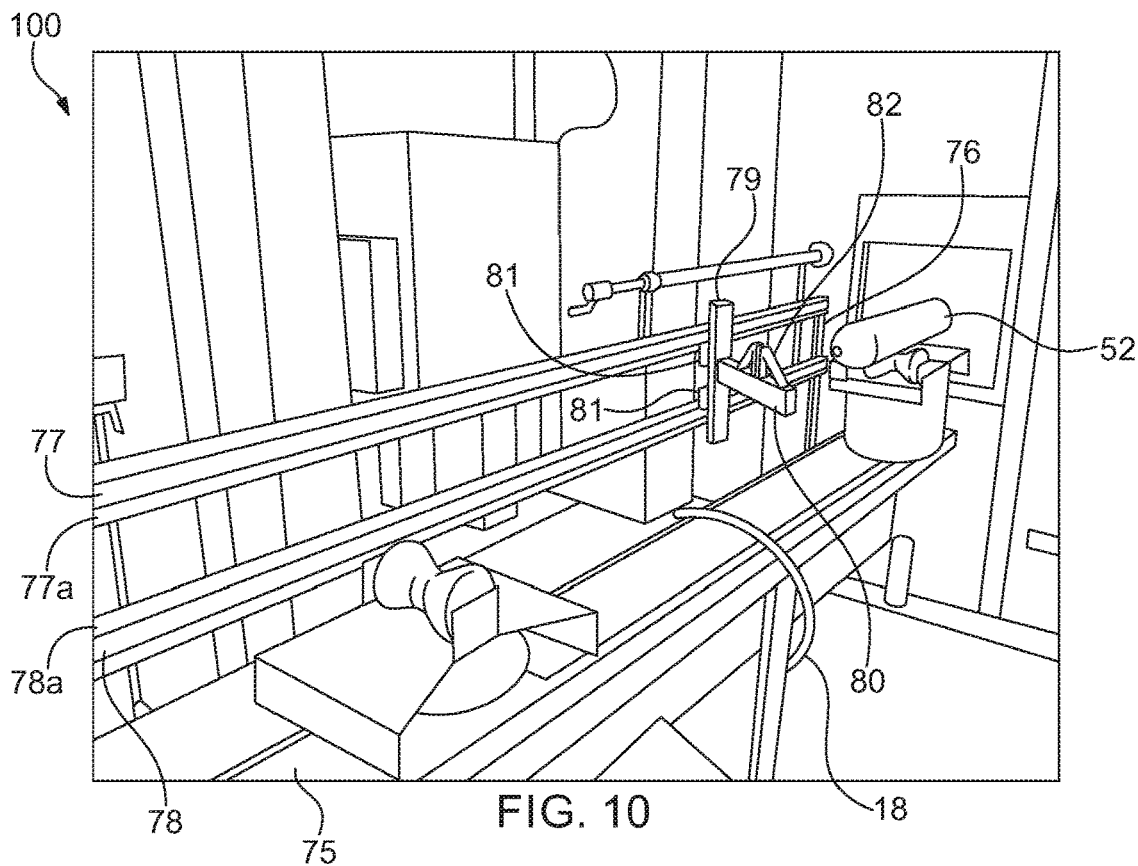
FIG. 10 illustrates an embodiment of the apparatus including a gas line, which delivers a purge gas to the apparatus, and a related purge support system.

Mentioned above is the use of a purge gas, typically oxygen. FIG. 10 illustrates the apparatus 100 including the gas line 18, which delivers the purge gas to the apparatus 100, and a related purge support system 85. The purge support system 85 is connected to the table 75 of the apparatus 100 by two or more vertical posts 76. An upper horizontal rail 77 and a parallel lower horizontal rail 78 are also connected to the vertical posts 76. The upper horizontal rail 77 defines an upper track 77a and the lower horizontal rail 78 defines a lower track 78a. The upper track 77a may be defined, as illustrated, in the bottom surface of the upper horizontal rail 77 while the lower track 78a may be defined, as illustrated, in the top surface of the lower horizontal rail 78.

Figure 12:
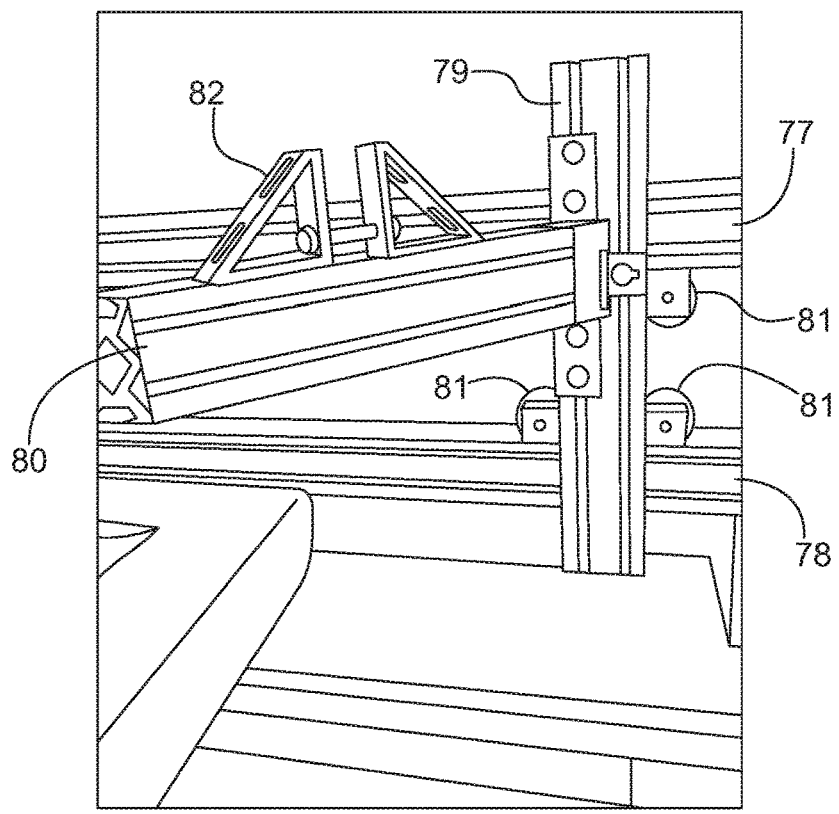
FIG. 12 shows how the pivot arm of the purge support system illustrated in FIG. 10 can pivot about the vertical strut of that purge support system.
Figure 13:
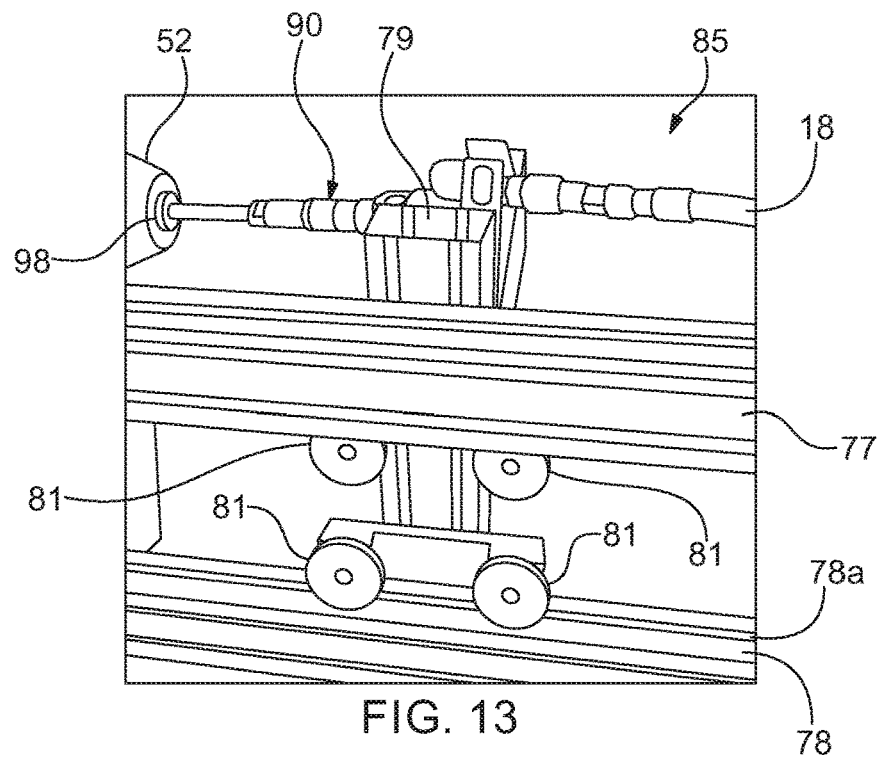
FIG. 13 is a rear view of the purge support system illustrated in FIG. 10 highlighting the engagement between the wheels and the lower track of that purge support system.

The purge support system 85 further includes a slidable vertical strut 79 connected to a pivot arm 80. As illustrated in FIG. 12, the pivot arm 80 can pivot in an arc of about 180 degrees about the vertical strut 79. The vertical strut 79 carries a plurality of wheels 81, typically through one or more wheel brackets. The wheels 81 engage the tracks 77a, 78a so that the vertical strut 79 can slide along the upper and lower horizontal rails 77, 78. FIG. 13 is a rear view highlighting the engagement between the wheels 81 and the lower track 78a. The pivot arm 80 carries a connection 82 which may be positioned on the top of the pivot arm 80 (as shown).

Figure 11:
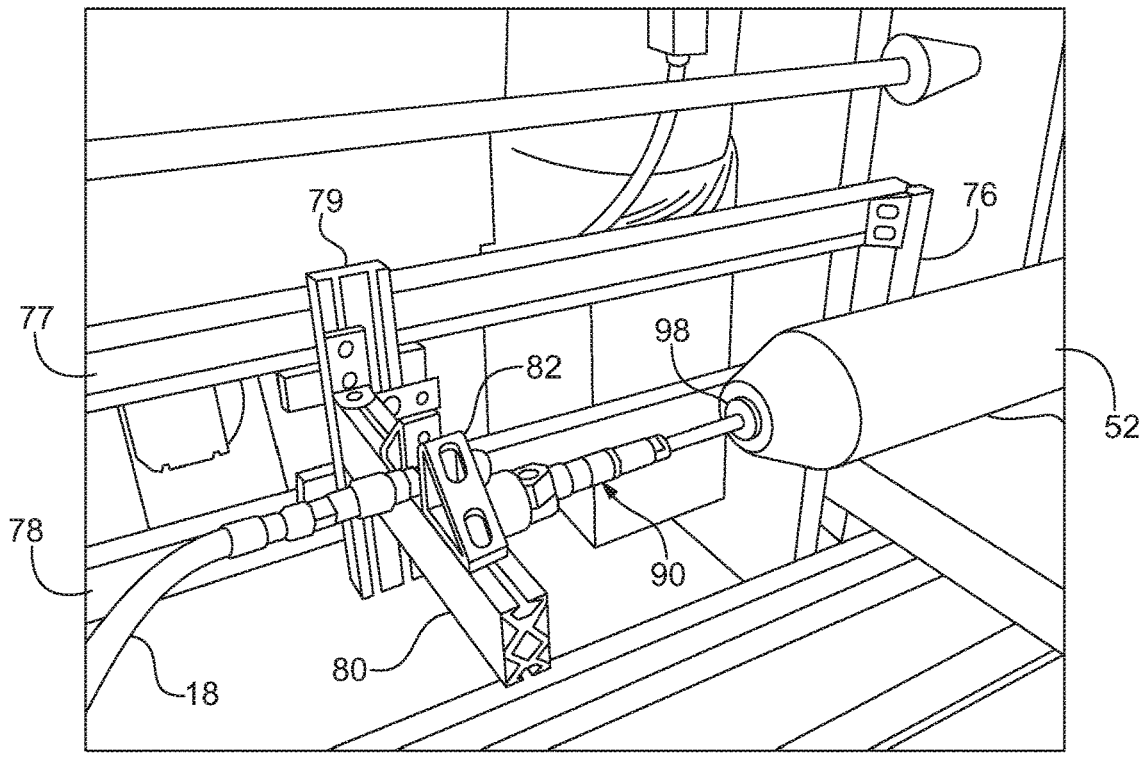
FIG. 11 shows the connection of the purge support system illustrated in FIG. 10 engaging and holding the purge device of that purge support system.

As illustrated in FIG. 11, the connection 82 engages and holds a purge device 90. One end of the purge device 90 can be attached (typically through a quick-connect coupling) to the gas line 18; the other end of the purge device 90 can be attached to a glass component such as the cylinder 52. Through the actions of the slidable vertical strut 79 and the pivot arm 80, the purge device 90 can be positioned easily with respect to both the gas line 18 and the cylinder 52.

Figure 14:
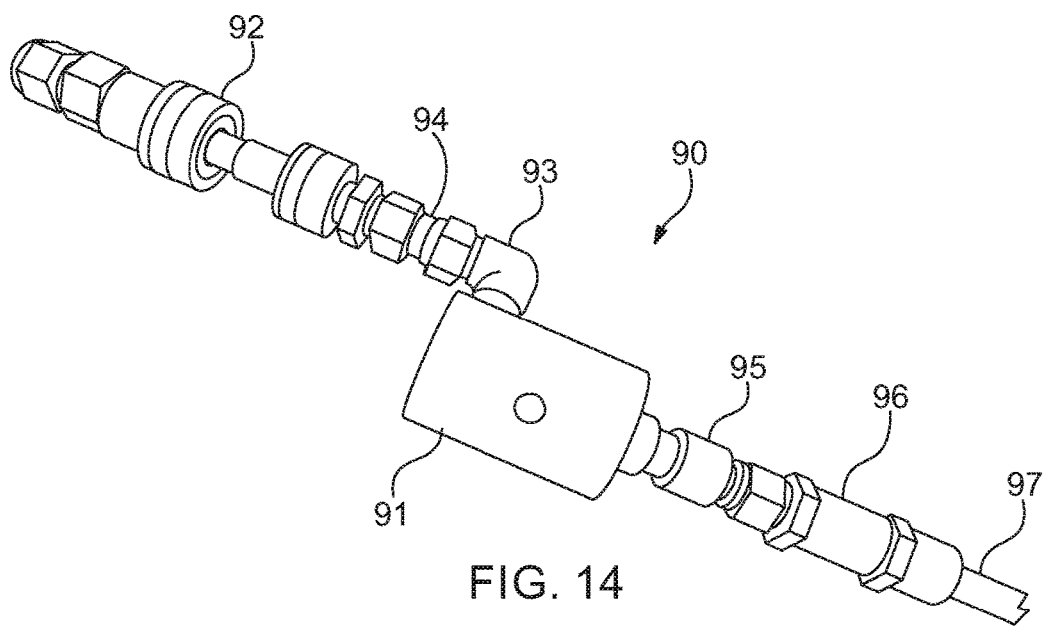
FIG. 14 is a perspective view of an example embodiment of the purge device shown in FIG. 11.

FIG. 14 illustrates an example embodiment of the purge device 90. In the example shown, the purge device 90 includes a rotary union 91 connected to a quick connect stem 92 through a male elbow 93 and a port connector 94. The quick connect stem 92 engages the gas line 18. The rotary union 91 is also connected to a female tube adapter 95 which, in turn, is connected through a particulate filter 96 to a tube 97. The tube 97 is connected to the glass component (e.g., the cylinder 52) through, for example, a plug 98 (as shown in FIG. 11). A number of materials are suitable for the plug 98, including silicone and graphite, such that the tube 97 is sealed to the cylinder 52.

Thus, the purge support system 85 of the apparatus 100 functions to deliver purge gas from the gas line 18 to the interior of the cylinder 52. The purge gas helps to facilitate the success of the welding process and to ensure the proper quality of the weld seam 13. More specifically, the purge gas helps to prevent particles from melting into the surface of the weld seam 13, which could adversely affect the weld strength and would have a negative impact on the properties of the final product.

EXAMPLES

The following examples are included to more clearly demonstrate the overall nature of the invention. These examples are exemplary, not restrictive, of the invention.

The first example is directed to a welding recipe for welding a first cylinder 52 to a second cylinder 62 (as depicted in FIG. 9a). Each of the cylinders 52, 62 has an ultra-high ratio ("UHR"), defined by a large outside diameter (OD) and a small inside diameter (ID), of greater than about 3 and, more preferably, greater than about 3.2. Thus, the cylinders 52, 62 preferably have a UHR of 3.2<OD/ID, which defines a relatively thick cylinder wall. Cylinders having a UHR have an increased risk of stress, cracks, and breakage—especially during cool down. The disclosed welding process advantageously can weld such UHR cylinders while reducing, if not eliminating, that risk.

Table 1 below summarizes the twelve steps of the example welding (i.e., butting) process or recipe. The "Torch" column indicates whether one torch 37 (T1) is activated, whether two torches 37, 38 (T1-T2) are activated, or whether neither torch 37, 38 is activated during a particular step in the process. The "Timer" column represents the total cumulative time (in minutes) of the entire process since inception; the example process lasted a total of 85 minutes. The "Duration" column represents the duration (in minutes) of each step of the process; the cool down step lasted 30 minutes. The "Distance" columns represent the distance (in both inches and millimeters, respectively) from the center line between the two torches 37, 38 to the ends of the two cylinders 52, 62; the ends have met when the distance is zero. The constant distance between the torches 37, 38 and the cylinders 52, 62 is 60 mm.

TABLE 1

Butting Recipe
UHR Cylinders
Torch to cylinder distance = 60 mm

| Step # | Torch | Timer | Duration | Distance (inches) Cyl.-Cyl. | Distance (mm's) Cyl.-Cyl. |
|---|---|---|---|---|---|
| 1 | T1 | 0 | 4 | 15.7 | 400 |
| 2 | T1 | 4 | 4 | 11.8 | 300 |

TABLE 1-continued

Butting Recipe
UHR Cylinders
Torch to cylinder distance = 60 mm

| Step # | Torch | Timer | Duration | Distance (inches) Cyl.-Cyl. | Distance (mm's) Cyl.-Cyl. |
|---|---|---|---|---|---|
| 3 | T1 | 8 | 4 | 7.9 | 200 |
| 4 | T1 | 12 | 4 | 3.9 | 100 |
| 5 | T1 | 16 | 4 | 2.4 | 60 |
| 6 | T1-T2 | 20 | 2 | 2.4 | 60 |
| 7 | T1-T2 | 22 | 13 | 1.2 | 30 |
| 8 | T1-T2 | 35 | 10 | 1.0 | 25 |
| 9 | T1-T2 | 45 | 5 | 0.6 | 15 |
| 10 | T1-T2 | 50 | 5 | 0.0 | 0 |
| 11 | Cool down | 55 | 30 | 0.0 | 0 |
| 12 | End Total | 85 | | 0.0 85 | 0 |

The example welding process summarized in Table 1 was used successfully to weld UHR cylinders 52, 62.

Figure 15:
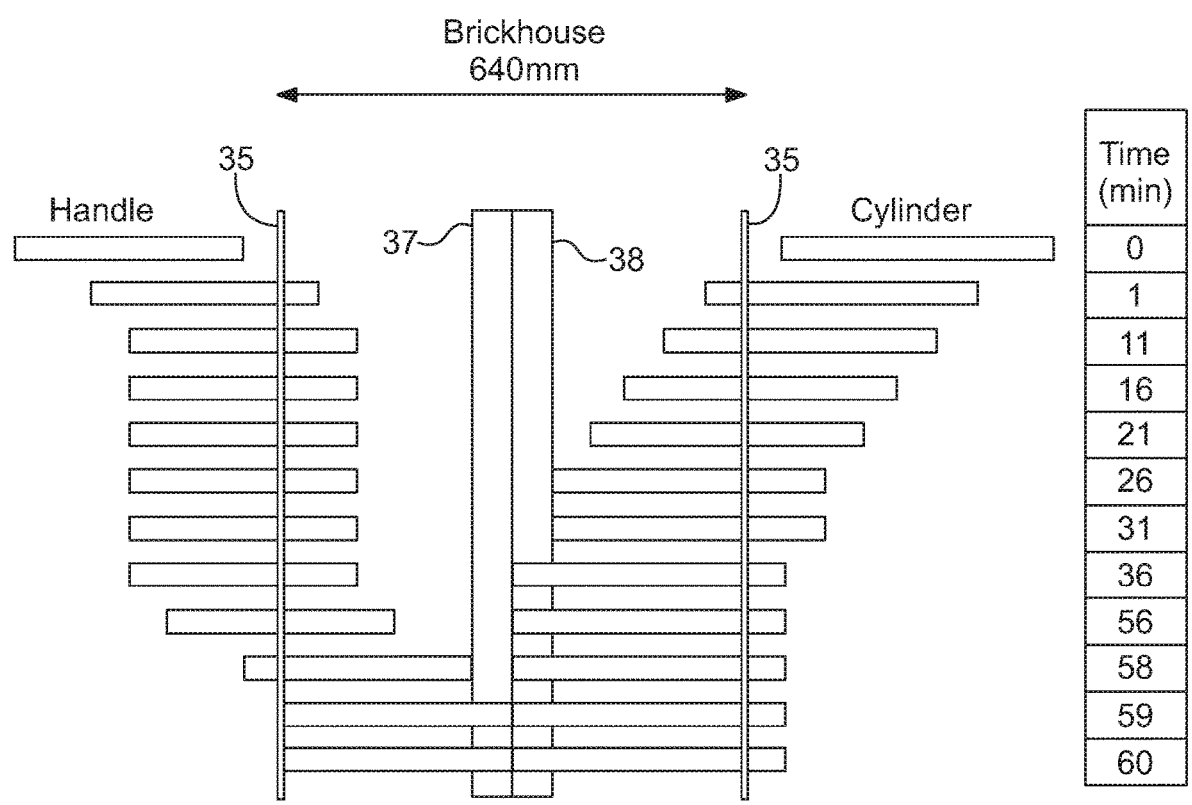
FIG. 15 schematically illustrates the location of a handle, a cylinder, and two torches relative to each other and to a brick house enclosure during each step of an example process for welding a handle to a cylinder.

The second example is directed to a welding process or recipe for welding a handle (such as the second holder 14a) to a UHR cylinder (such as the inner tube 2) as depicted in FIG. 4a but using the brick house enclosure 35. Table 2 below summarizes the twelve steps of the example welding process or recipe, before cool down, and FIG. 15 schematically illustrates the location of the handle (the second holder 14a), the cylinder (the inner tube 2), and the two (1 & 2) torches 37, 38 relative to each other and to the brick house enclosure 35 during each step of the process. As illustrated, the brick house enclosure 35 has a length of about 640 mm (and its ends are defined by the two, solid, vertical lines depicted in FIG. 15).

In Table 2 below, the "Time" column represents the total cumulative time (in minutes) of the entire process since inception; the example process lasted a total of 60 minutes (before cool down). The "Duration" column represents the duration (in minutes) of each step of the process. The "Distance" column represents the distance (in millimeters) from the end of the handle to the end of the cylinder; the ends have met when the distance is zero. The "Handle to torch" column represents the distance (in millimeters) from the end of the handle to the center line between the two torches 37, 38. The "Cyl to torch" column represents the distance (in millimeters) from the end of the cylinder to the center line between the two torches 37, 38. The "Torch" column indicates whether one torch 37 (1) is activated or whether two torches 37, 38 (1 & 2) are activated during a particular step in the process.

TABLE 2

| Time [min] | Duration [min] | Distance [mm] | Handle to torch | Cyl to torch | Torch |
|---|---|---|---|---|---|
| 0 | 1 | 840 | 420 mm | 420 mm | 1 |
| 1 | 10 | 500 | 250 mm | 250 mm | 1 |
| 11 | 5 | 361 | 180 mm | 181 mm | 1 |
| 16 | 5 | 304 | 180 mm | 124 mm | 1 |
| 21 | 5 | 247 | 180 mm | 67 mm | 1 |
| 26 | 5 | 201 | 180 mm | 21 mm | 1 |
| 31 | 5 | 201 | 180 mm | 21 mm | 1 & 2 |
| 36 | 15 (to 20) | 155 | 180 mm | −25 mm | 1 & 2 |
| 56 | 2 | 132 | 134 mm | −2 mm | 1 & 2 |

TABLE 2-continued

| Time [min] | Duration [min] | Distance [mm] | Handle to torch | Cyl to torch | Torch |
|---|---|---|---|---|---|
| 58 | 1 | 18 | 20 mm | −2 mm | 1 & 2 |
| 59 | 1 | 0 | 0 mm | 0 mm | 1 & 2 |
| 60 | 3-5 | 0 | paddle & anneal | | 1 & 2 |

The example welding process summarized in Table 2 and illustrated in FIG. 15 was used successfully to weld a handle to a UHR cylinder.

The cylinder-to-handle (including double cylinders) welds prepared by the described process are beneficial to drawing low-hydroxide substrates and other tubes from very heavy and cost-effective batches. The hydroxide content is in the weld zone just at the beneficial level for the handling of the heavy batches. The approximately 20 to 100 ppm hydroxide content in the outer layer or surface of the weld zone provides in combination with the smooth surface the highest possible weld strength. After etching and removal of the hydroxide for fiber applications, the cylinder can directly be transported to the tower for drawing. Thus, both the base material and the cylinder can be used in the most beneficial hydroxide range.

For fiber applications, it is not possible to target for higher hydroxide levels for the sake of strength considerations. This would increase the attenuation, which is not beneficial for this application. The hydroxide content of the handle base material is at least 10 ppm; otherwise, the material is too brittle. Handle base materials with hydroxide contents larger than about 50 ppm are not an option because the viscosity is adversely affected, and the end phase of the forming tower would be negatively affected (too early drop of the last cylinder portion due to the lower handle glass viscosity). Thus, the preferred hydroxide content for the handle is within the range of about 10 to 50 ppm.

To target for handle material for the same low hydroxide levels as for the cylinder material is not beneficial because the annealing costs are too high. And hydroxide levels lower than about 10 ppm decrease the handle strength significantly. Those low hydroxide levels lead to higher handle head break rates in the drawing tower.

In summary, the welding process includes the steps of (i) clamping both quartz glass components (e.g., the second holder 14a and the hollow inner tube 2) in the chucks 33 of the lathe; (ii) moving the components towards each other using the lathe; (iii) jointly and simultaneously heating and softening the opposite end areas of the components; (iv) pressing the softened front edges against each other to form a component assembly having a weld seam 13; (v) if necessary, pressing a graphite paddle against the softened outer surface to shape the surface; and (vi) cooling the component assembly to ambient temperature. Preferably, the components are heated and softened at a process temperature above 2,200° C., and typically between about 2,200° C. to 2,300° C., for a period of about 20 minutes. The components are then cooled while inside the brick house enclosure 35 from the process temperature to a temperature of about 1,000° C. requiring a time interval of at least 5 minutes and typically about 10 minutes.

The disclosed apparatus and related welding process can accommodate heavy weight cylinder assemblies, with high-strength welds, capable of supporting a vertically held cylinder of at least 100 kg. The vertically aligned system includes at least two quartz glass components attached with a welding zone between them. The lower quartz glass component has a weight of at least 100 kg. The upper handle weld can hold two or three cylinders each having a weight of at least 100 kg. The weld zone has a tensile strength exceeding about 10 MPa, and preferably about 15 MPa. Tensile tests have shown that the handle head strength is about 2 MPa. At least 80% of the weld zone has a hydroxide content greater than about 10 ppm average in a 10 µm depth from the surface.

The described process allows the polishing of the weld zone to a surface defect-free area. The utilization of the propane torches 37, 38 ensures the proper hydroxide content in the surface, to keep the glass viscosity at the optimal level, and the brick house enclosure 35 allows a slow cool down rate of the glass to minimize the stress in the weld. The combination of these structural features yields a weld for which failures are minimized as compared to conventional weld processes.

Specifically, for example, when welds are formed according to the described process the crack rates of double cylinder welds at or on the way to the forming tower are much less than 0.5%. Compare such favorable crack rates with the crack rates achieved by conventional processes. Arc welding processes have a crack rate of greater than 5%, and the outside diameter (OD) must be reduced to about 100 mm given difficulties in applying the heat to larger surfaces. A conventional hydrogen burner set up with no brick house enclosure and glass wool used to reduce the cool down rate had a crack rate of about 1%. In addition, the OD was reduced to about 150 mm given the lack of power in the hydrogen torch. The crack rate for a conventional laser welding process was greater than about 10% and the OD is limited to about 150 mm. The OD for plasma welding is limited to about 120 mm. Furnace welding cannot be used for waveguide fiber applications given contamination risks.

World-wide connected devices, cloud services, 5G (5th generation mobile networks or 5th generation wireless systems, which denotes a major phase of mobile telecommunications standards), and Industry 4.0 (or the fourth industrial revolution, the current trend of automation and data exchange in manufacturing technologies including cyber-physical systems, the Internet of things, and cloud computing), and other advances are driving an exponentially increasing demand for bandwidth. Therefore, optical fiber manufacturers must increase their output and productivity. For next generation optical fiber manufacturing, very large preforms drawn at high speeds are required. The result of the high-strength welding process for making heavy glass preforms with large cross sectional areas is a "ready-to-draw" solid preform that can sustain multiple days of uninterrupted optical fiber draw, increasing the productivity and optical fiber output for users of the preform.

The foregoing description of preferred embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims. It is expressly intended, for example, that all ranges broadly recited in this document include within their scope all narrower ranges which fall within the broader ranges. It is also expressly intended that, as is understood by those skilled in the art, certain steps included in the process may be omitted; certain additional steps may be added; and the order of the steps may be altered from the specific order described.

What is claimed:

1. A process for creating a high-strength weld seam in the center of a weld zone between two glass components of a welded assembly, the process comprising:
   (a) providing two glass cylinder components each having a first end, an opposing second end, a central bore, and a ground surface, wherein each of the two glass cylinder components has an outside diameter and an inside diameter and wherein a ratio of the outside diameter to the inside diameter of each of the two glass cylinder components is greater than 3.0;
   (b) clamping the first end of each glass cylinder component in the respective chucks of a lathe;
   (c) moving the glass cylinder components towards each other using the lathe into an enclosure in which the second end of the first glass cylinder component and the second end of the second glass cylinder component are heated, softened, and welded together to form the weld seam in the weld zone, the enclosure having layers of stacked quartz glass bricks and allowing the weld zone to cool slowly and avoid stress in the weld zone;
   (d) jointly and simultaneously heating and softening the second end of the first cylinder glass component and the second end of the second glass cylinder component in the enclosure using at least one propane quartz melting torch directing a flame inside the enclosure and toward the second ends of the glass cylinder components as the glass cylinder components move toward each other, the flame creating substantially smooth polished surfaces in the weld zone proximate the second end of each glass cylinder component having an increased hydroxide content;
   (e) pressing the softened second ends of the glass cylinder components against each other to form the weld seam in the weld zone of the welded assembly; and
   (f) cooling the welded assembly to ambient temperature, wherein at least a portion of the cooling is done at a rate of about 60° C. per minute, and
   wherein at least 80% of the weld zone has a hydroxide content greater than about 10 ppm average in a 10 µm depth from the surface and the tensile strength of the weld zone is greater than about 10 MPa.

2. The process of claim 1, further comprising the step, after the step (e) of pressing the softened second ends of the glass cylinder components against each other to form the weld seam in the weld zone, the step of pressing a paddle against the outer surface of the weld zone to shape the weld zone.

3. The process of claim 1, wherein during the step (d) of jointly and simultaneously heating and softening the second end of the first glass cylinder component and the second end of the second glass cylinder component, introducing a purging gas into the central bore to prevent the flame from entering the central bore, thereby assuring that the hydroxide content on the inside surface of the cylinder is less than on the outside surface of the cylinder.

4. The process of claim 1, further comprising the step, after the step (f) of cooling, of removing the 10 µm depth from the surface of the weld zone.

5. The process of claim 1, wherein the roughness of the ground surfaces of the cylinders is $R_z < 6$ µm and the roughness of the smooth polished surfaces is $R_z < 0.3$ µm.

6. The process of claim 1, wherein at least 80% of the weld zone has a hydroxide content between about 20 and about 100 ppm average in a 10 μm depth from the surface.

7. The process of claim 1, wherein the step (a) of providing two glass cylinder components includes providing a chamfered second end on at least one of the two glass cylinder components.

8. The process of claim 1, wherein the enclosure further comprises a base layer made of graphite upon which the layers of stacked quartz glass bricks are disposed.

* * * * *